US011296840B1

(12) United States Patent
Jiang et al.

(10) Patent No.: US 11,296,840 B1
(45) Date of Patent: Apr. 5, 2022

(54) MEDIA ACCESS CONTROL FOR FREQUENCY DIVISION FULL DUPLEX IN WLAN

(71) Applicant: Marvell International Ltd., Hamilton (BM)

(72) Inventors: Jinjing Jiang, San Jose, CA (US); Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 121 days.

(21) Appl. No.: 16/670,934

(22) Filed: Oct. 31, 2019

Related U.S. Application Data

(60) Provisional application No. 62/753,632, filed on Oct. 31, 2018.

(51) Int. Cl.
*H04L 5/00* (2006.01)
*H04W 84/12* (2009.01)
(Continued)

(52) U.S. Cl.
CPC .............. *H04L 5/0037* (2013.01); *H04J 1/04* (2013.01); *H04L 5/0057* (2013.01); *H04L 5/14* (2013.01);
(Continued)

(58) Field of Classification Search
CPC . H04J 1/04; H04L 5/0057; H04L 5/14; H04L 47/14; H04L 47/15; H04L 5/0094;
(Continued)

(56) References Cited

U.S. PATENT DOCUMENTS 9,450,743 B1    9/2016  Chu et al.
10,129,881 B2  11/2018  Yang et al.
(Continued)

FOREIGN PATENT DOCUMENTS

CN   110972256 A  *  4/2020
EP      2028809 A2    2/2009
(Continued)

OTHER PUBLICATIONS

Fischer et al., "IEEE P802.11—Wireless LANs—Disallowed Sub channels," doc. No. IEEE 802.11-18/0496r3, *The Institute of Electrical and Electronics Engineers*, pp. 1-11 (May 2018).
(Continued)

*Primary Examiner* — Ayaz R Sheikh
*Assistant Examiner* — Louis Samara

(57) ABSTRACT

A first communication device in a wireless local area network (WLAN) determines one or more frequency division, full duplex (FDFD) parameters for an FDFD operation that includes FDFD communications via a first frequency segment and a second frequency segment. The first frequency segment and the second frequency segment are separated by a gap in frequency. The one or more FDFD parameters include a parameter indicating a duration of the FDFD operation. The first communication device generates a communication frame that includes one or more indications of the one or more FDFD parameters. The one or more indications in the communication frame include an indication of the duration of the FDFD operation. The first communication device transmits the communication frame to prompt a plurality of second communication devices to participate in the FDFD operation.

24 Claims, 11 Drawing Sheets

(51) Int. Cl.
*H04W 80/02* (2009.01)
*H04L 5/14* (2006.01)
*H04W 28/02* (2009.01)
*H04L 47/10* (2022.01)
*H04W 72/04* (2009.01)
*H04J 1/04* (2006.01)
*H04W 28/10* (2009.01)

(52) U.S. Cl.
CPC ............... *H04L 47/14* (2013.01); *H04L 47/15* (2013.01); *H04W 28/0268* (2013.01); *H04W 28/10* (2013.01); *H04W 72/0453* (2013.01); *H04W 80/02* (2013.01); *H04W 84/12* (2013.01)

(58) Field of Classification Search
CPC ............. H04L 1/0002; H04L 27/2607; H04W 28/0268; H04W 28/10; H04W 72/0453; H04W 80/02; H04W 84/12; H04W 72/04; H04W 74/04; H04W 74/0875
See application file for complete search history.

(56) References Cited

U.S. PATENT DOCUMENTS

| | | | |
|---|---|---|---|
| 10,257,806 B2 | 4/2019 | Chu et al. | |
| 10,349,413 B2 | 7/2019 | Zhang et al. | |
| 2011/0249659 A1 | 10/2011 | Fontaine et al. | |
| 2013/0148625 A1* | 6/2013 | Kim | H04L 27/2613 370/329 |
| 2016/0212748 A1 | 7/2016 | Yang et al. | |
| 2016/0380744 A1* | 12/2016 | Aryafar | H04L 1/0002 370/277 |
| 2017/0041961 A1* | 2/2017 | Zou | H04W 74/0875 |
| 2017/0149547 A1 | 5/2017 | Kim et al. | |
| 2017/0181136 A1 | 6/2017 | Bharadwaj et al. | |
| 2017/0290061 A1* | 10/2017 | Merlin | H04W 72/0446 |
| 2017/0311204 A1 | 10/2017 | Cariou et al. | |
| 2017/0325178 A1 | 11/2017 | Verma et al. | |
| 2017/0366329 A1 | 12/2017 | Cao et al. | |
| 2018/0020476 A1 | 1/2018 | Aljaz et al. | |
| 2018/0115403 A1 | 4/2018 | Sakai et al. | |
| 2018/0302858 A1 | 10/2018 | Son et al. | |
| 2019/0123863 A1 | 4/2019 | Zhang et al. | |
| 2019/0182714 A1 | 6/2019 | Chu et al. | |
| 2019/0182863 A1 | 6/2019 | Chu et al. | |
| 2019/0349930 A1 | 11/2019 | Chu et al. | |
| 2020/0052769 A1* | 2/2020 | Cirik | H04W 74/0833 |
| 2020/0267653 A1* | 8/2020 | Son | H04L 5/0041 |
| 2020/0351134 A1* | 11/2020 | Park | H04L 27/2607 |

FOREIGN PATENT DOCUMENTS

| | | | | |
|---|---|---|---|---|
| EP | 2999252 A1 | 3/2016 | | |
| GB | 2501898 A | 11/2013 | | |
| WO | WO-2006/000955 A1 | 1/2006 | | |
| WO | WO-2012/026779 A2 | 3/2012 | | |
| WO | WO-2013/168105 | 11/2013 | | |
| WO | WO-2013168105 A1 * | 11/2013 | ............ | H04W 74/04 |
| WO | WO-2015/099803 A1 | 7/2015 | | |
| WO | WO-2017/026937 A1 | 2/2017 | | |
| WO | WO-2017/111567 A2 | 6/2017 | | |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Orfanos et al., "A New Distributed Coordination Function for W-LANs with Multiple Channel Structure," Proceedings of the 14th 1st Mobile and Wireless Communications Summit, Dresden, Germany, 5 pages (Jun. 19, 2005).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

* cited by examiner

MEDIA ACCESS CONTROL FOR FREQUENCY DIVISION FULL DUPLEX IN WLAN

CROSS REFERENCES TO RELATED APPLICATIONS

This application claims the benefit of U.S. Provisional Patent Application No. 62/753,632, entitled "Protocols to Enable Frequency Division Full Duplex (FDFD) WLAN," filed on Oct. 31, 2018, which is incorporated herein by reference in its entirety.

FIELD OF TECHNOLOGY

The present disclosure relates generally to wireless communication systems, and more particularly to full duplex communications in a wireless local area network (WLAN).

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. To achieve greater throughput, frequency division full duplex (FDFD) will likely be permitted in future developments of the IEEE 802.11 Standard. FDFD involves simultaneously transmitting and receiving via different frequency portions of a communication channel, or simultaneously performing unsynchronized communications with different communication devices via different frequency portions of the communication channel. For example, a communication device includes multiple radio frequency (RF) chains such that a first RF chain transmits on a first frequency portion of a WLAN communication channel concurrently with a second RF chain receiving on a second frequency portion of the WLAN communication channel. As another example, a first communication device receives a transmission from a second communication device via a first RF chain, and simultaneously receives a second unsynchronized transmission from a third communication device via a second RF chain.

FDFD improves throughput, but increases complexity with regard to media access control (MAC) operations such as a communication device gaining access to a FDFD communication channel, multiple communication devices sharing the FDFD communication channel, etc.

SUMMARY

In an embodiment, a method for frequency division, full duplex (FDFD) communication in a wireless local area network (WLAN), includes: determining, at a first communication device, one or more FDFD parameters for an FDFD operation that includes FDFD communications via a first frequency segment and a second frequency segment, wherein the first frequency segment and the second frequency segment are separated by a gap in frequency, and wherein the one or more FDFD parameters include a parameter indicating a duration of the FDFD operation; generating, at the first communication device, a communication frame that includes one or more indications of the one or more FDFD parameters, wherein the one or more indications in the communication frame include an indication of the duration of the FDFD operation; transmitting, by the first communication device, the communication frame to prompt a plurality of second communication devices to participate in the FDFD operation; and participating, by the first communication device, in the FDFD operation.

In another embodiment, a first wireless communication device for communicating in a WLAN comprises: a wireless network interface device comprising one or more integrated circuits (ICs) devices. The one or more IC devices are configured to: determine one or more FDFD parameters for an FDFD operation that includes FDFD communications via a first frequency segment and a second frequency segment, wherein the first frequency segment and the second frequency segment are separated by a gap in frequency, and wherein the one or more FDFD parameters include a parameter indicating a duration of the FDFD operation; generate a communication frame that includes one or more indications of the one or more FDFD parameters, wherein the one or more indications in the communication frame include an indication of the duration of the FDFD operation; transmit the communication frame to prompt a plurality of second wireless communication devices to participate in the FDFD operation; and participate in the FDFD operation.

In yet another embodiment, a method for FDFD communication in a WLAN, includes: receiving, at a communication device, a communication frame that includes one or more indications of one or more FDFD parameters for an FDFD operation that includes FDFD communications via a first frequency segment and a second frequency segment, wherein the one or more indications in the communication frame include an indication of a duration of the FDFD operation; determining, at the communication device, one or more FDFD parameters for the FDFD operation using the one or more indications of the one or more FDFD parameters in the communication frame, including using the indication of the duration of the FDFD operation to determine the duration of the FDFD operation; and participating, by the communication device, in the FDFD operation, including at least one of i) transmitting in the second frequency segment or ii) receiving in the second frequency segment.

In still another embodiment, a wireless communication device for communicating in a WLAN comprises: a wireless network interface device comprising one or more IC devices. The one or more IC devices are configured to: receive a communication frame that includes one or more indications of one or more FDFD parameters for an FDFD operation that includes FDFD communications via a first frequency segment and a second frequency segment, wherein the one or more indications in the communication frame include an indication of a duration of the FDFD operation; determine one or more FDFD parameters for the FDFD operation using the one or more indications of the one or more FDFD parameters in the communication frame, including using the indication of the duration of the FDFD operation to determine the duration of the FDFD operation; and participate in the FDFD operation, including at least one of i) transmitting in the second frequency segment or ii) receiving in the second frequency segment.

DETAILED DESCRIPTION

Figure 1:
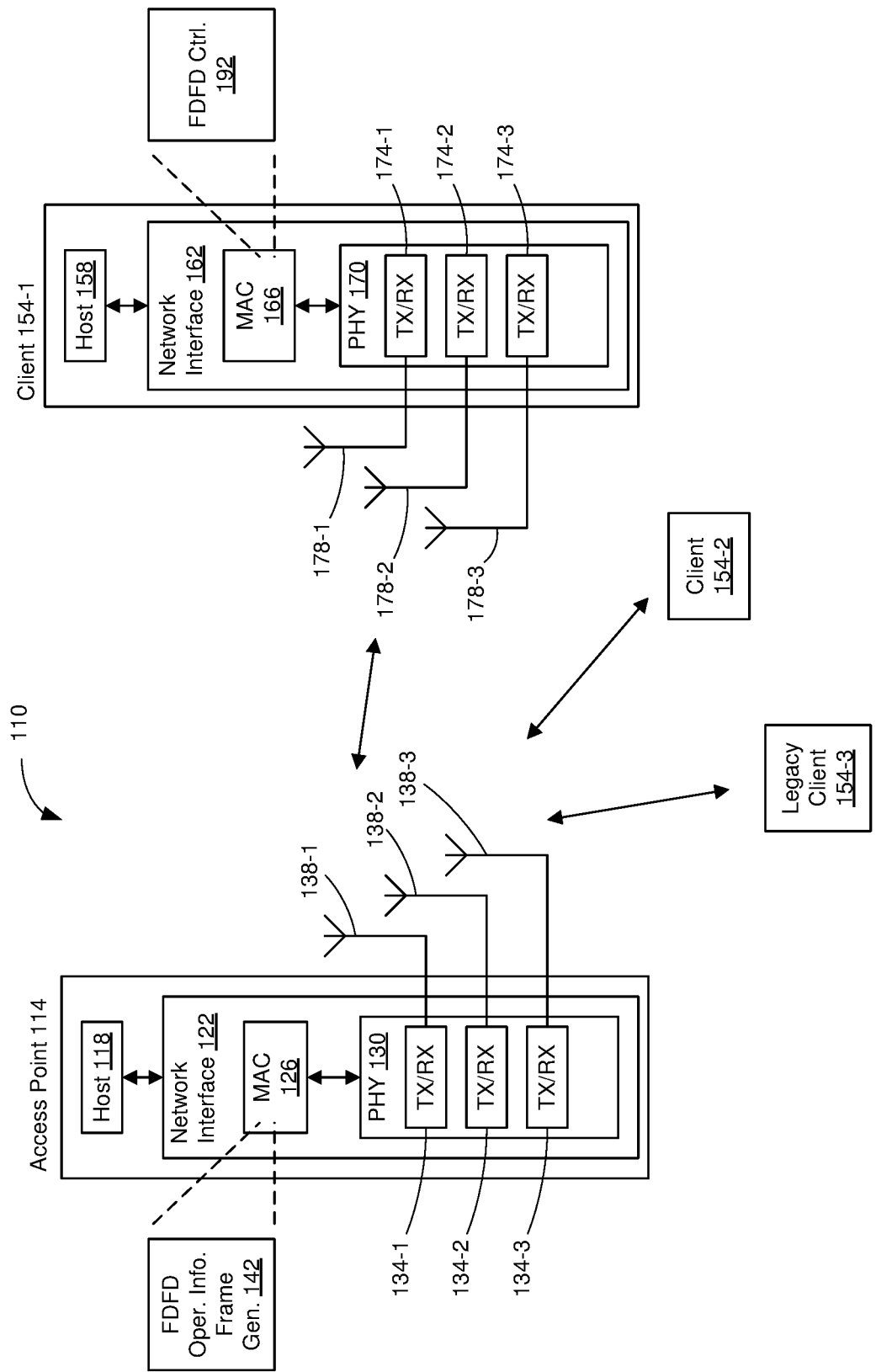
FIG. 1 is a block diagram of an example wireless local area network (WLAN) that performs frequency division, full duplex (FDFD) communications, according to an embodiment.

The IEEE 802.11n Standard communication protocol, the IEEE 802.11ac Standard communication protocol, and the current draft of the IEEE 802.11ax Standard communication protocol permit an access point (AP) of a wireless local area network (WLAN) to establish an operating channel that comprises multiple 20 MHz communication sub-channels (sometimes referred to herein as "component channels") aggregated together to form a composite communication channel. For example, an access point (AP) may establish an operating channel by aggregating two adjacent 20 MHz sub-channels to form a 40 MHz composite channel; by aggregating four adjacent 20 MHz sub-channels to form an 80 MHz composite channel; or by aggregating eight adjacent 20 MHz sub-channels to form a 160 MHz composite channel. It has been proposed for future WLAN protocols that 20 MHz sub-channels in different radio frequency (RF) bands may be aggregated together to form a larger composite channel.

It has also been proposed for future WLAN protocols that, to achieve greater throughput, frequency division full duplex (FDFD) should be permitted. As one example of an FDFD operation, a first frequency portion (e.g., a first one or more sub-channels, a first frequency resource unit (RU), etc.) is used for the AP to transmit packets to client stations (sometimes referred to herein as a "forward direction" or a "downlink direction"), whereas a second frequency portion (e.g., a second one or more sub-channels, a second frequency RU, etc.) is used for the client stations to transmit acknowledgements to the AP (sometimes referred to herein as a "reverse direction" or a "uplink direction"), according to some embodiments. Such an FDFD operation is sometimes referred to herein as a "forward/reverse FDFD operation," or an "uplink/downlink FDFD operation" (which is a type of forward/reverse FDFD operation).

In another example of an FDFD operation, the AP receives or transmits a first transmission from/to a first client station via a first frequency portion (e.g., a first one or more sub-channels, a first frequency RU, etc.), and simultaneously receives or transmits a second unsynchronized transmission from/to a second client station via a second frequency portion (e.g., a second one or more sub-channels, a second frequency RU, etc.), according to some embodiments. Such an FDFD operation is sometimes referred to herein as a "multi-station FDFD operation."

Other suitable FDFD operations additionally or alternatively are used in other embodiments.

To facilitate such FDFD operations, the AP generates and transmits an FDFD operation information frame to provide client stations with information regarding an FDFD operation so that the client stations can participate in the FDFD operation, according to various embodiments. In various embodiments, the FDFD operation information frame includes scheduling information regarding the FDFD operation such as one of, or any suitable combination of two or more of, an indication of a frequency portion that is available for the one or more client stations to use during the FDFD operation, an indication of a duration of the FDFD operation, an indication of a transmit opportunity period (TXOP) corresponding to the FDFD operation, etc.

As one illustrative example, to facilitate an uplink/downlink FDFD operation, the AP (an example of an initiator communication device) generates and transmits an FDFD scheduling frame (an example of an FDFD operation information frame) to client stations to provide the client stations with information regarding the multi-station FDFD operation, according to some embodiments described below. In various embodiments, the FDFD scheduling frame includes scheduling information such as one of, or any suitable combination of two or more of, an indication of a duration of the forward/reverse FDFD operation, an indication of a TXOP corresponding to the forward/reverse FDFD operation, one or more indications of one or more of i) a first frequency portion for a forward direction, ii) a second frequency portion for a reverse direction, etc. In various embodiments, the FDFD scheduling frame additionally or alternatively includes other scheduling information such as ordering information that indicates an order in which client stations are to transmit in the reverse direction during the forward/reverse FDFD operation period.

As another illustrative example, the AP generates and transmits an FDFD announcement frame (another example of an FDFD operation information frame) to provide client stations with information regarding a multi-station FDFD operation so that the client stations can participate in the multi-station FDFD operation, according to various embodiments. In various embodiments, the FDFD announcement frame includes scheduling information such as one of, or any suitable combination of two or more of, an indication of a first frequency portion that is available for one or more first client stations to use during the multi-station FDFD operation while the AP is communicating with one or more second client stations via a second frequency portion, an indication of a TXOP during which the one or more first client stations can use the first frequency portion as part of the multi-station FDFD operation, etc.

FIG. 1 is a block diagram of an example WLAN 110 that uses FDFD communications, according to an embodiment. The WLAN 110 includes an AP 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the network interface device 122 is configured for operating within a single RF band at a given time. In another embodiment, the network interface device 122 is configured for operating within multiple RF bands at the same time. For example, in an embodiment, the network interface device 122 includes multiple PHY processors 130 to facilitate multi-RF band communication, where respective PHY processors 130 correspond to respective RF bands. In another embodiment, the network interface device 122 includes a single PHY processor 130, where each transceiver 134 includes respective RF radios corresponding to respective RF bands to facilitate multi-band communication. For brevity and ease of explanation, FIG. 1 shows a single PHY processor 130 and the present disclosure refers to "the PHY processor 130". In some embodiments, however, "the PHY processor 130" referred to in the present application comprises multiple PHY processors 130, e.g., to facilitate multi-RF band communication.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130, according to some embodiments. The PHY processor 130 is configured to receive MAC layer data units from the MAC processor 126 and encapsulate the MAC layer data units to generate PHY data units such as PHY protocol data units (PPDUs) for transmission via the antennas 138, according to some embodiments. Similarly, the PHY processor 130 is configured to receive PHY data units that were received via the antennas 138, and extract MAC layer data units encapsulated within the PHY data units, according to some embodiments. The PHY processor 130 provides the extracted MAC layer data units to the MAC processor 126, which processes the MAC layer data units, according to some embodiments.

PHY data units are sometimes referred to herein as "packets", and MAC layer data units are sometimes referred to herein as "frames".

In connection with generating one or more RF signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., that are not shown in FIG. 1 for purposes of brevity.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

According to an embodiment, the MAC processor 126 includes an FDFD operation information frame generator 142 that is configured to generate an FDFD operation information frame that provides scheduling information for use by client stations to participate in an FDFD operation. Examples of scheduling information in the FDFD operation information frame include any of an indication of a frequency portion that is available for one or more client stations to use during the FDFD operation, an indication of a duration of the FDFD operation, an indication of a TXOP corresponding to the FDFD operation, etc.

As one illustrative example, the FDFD operation information frame generator 142 is configured to generate an FDFD scheduling frame to facilitate an forward/reverse FDFD operation, according to some embodiments described below. In various embodiments, the FDFD scheduling frame includes scheduling information such as one of, or any suitable combination of two or more of, an indication of a duration of the forward/reverse FDFD operation, an indication of a TXOP corresponding to the forward/reverse FDFD operation, one or more indications of i) a first frequency portion for a forward direction, ii) a second frequency portion for a reverse direction, etc. In various embodiments, the FDFD scheduling frame additionally or alternatively includes ordering information that indicates an order in which client stations are to transmit in the reverse direction during the forward/reverse FDFD operation period.

As another illustrative example, the FDFD operation information frame generator 142 is configured to generate an FDFD announcement frame to facilitate a multi-station FDFD operation, according to some embodiments described below. In various embodiments, the FDFD announcement frame includes scheduling information such as one of, or any suitable combination of two or more of, an indication of a first frequency portion that is available for one or more first client stations to use during the multi-station FDFD operation while the AP is communicating with one or more second client stations via a second frequency portion, an indication of a TXOP during which the one or more first client stations can use the first frequency portion as part of the multi-station FDFD operation, etc.

In an embodiment, the FDFD operation information frame generator 142 is implemented by a processor (not shown) configured to execute machine readable instructions stored in a memory device (not shown) such as a RAM, a read ROM, a flash memory, etc. In another embodiment, the FDFD operation information frame generator 142 includes a hardware state machine (not shown). The processor and/or the hardware state machine are configured to generate FDFD operation information frames, according to some embodiments.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170, according to some embodiments. The PHY processor 170 is configured to receive MAC layer data units from the MAC processor 166 and encapsulate the MAC layer data units to generate PHY data units such as PPDUs for transmission via the antennas 178, according to some embodiments. Similarly, the PHY processor 170 is configured to receive PHY data units that were received via the antennas 178, and extract MAC layer data units encapsulated within the PHY data units, according to some embodiments. The PHY processor 170 provides the extracted MAC layer data units to the MAC processor 166, which processes the MAC layer data units, according to some embodiments.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc., that are not shown in FIG. 1 for purposes of brevity.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor (not shown) configured to execute machine readable instructions stored in a memory device (not shown) such as a RAM, a ROM, a flash memory, etc. In an embodiment, the MAC processor 166 includes a hardware state machine (not shown).

According to an embodiment, the MAC processor 166 includes an FDFD controller 192 that is configured to control the network interface device 162 in connection with FDFD operations. For example, the FDFD controller 192 is configured to receive an FDFD operation information frame from the AP and use scheduling information in the FDFD operation information frame to control the network interface device 162 to participate in an FDFD operation corresponding to the FDFD operation information frame. For example, the FDFD controller 192 uses an indication (in the FDFD operation information frame) of a frequency portion that is available for one or more client stations to use during an FDFD operation, and to control the PHY processor 170 to receive and/or transmit via the indicated frequency portion during the FDFD operation, according to an embodiment. As another example, the FDFD controller 192 uses an indication (in the FDFD operation information frame) of a duration of the FDFD operation, and to determine when the FDFD operation will end, according to an embodiment. As another example, the FDFD controller 192 uses an indication (in the FDFD operation information frame) of a duration of a TXOP corresponding to the FDFD operation, and to determine when the TXOP will end, according to an embodiment.

As one illustrative example, the FDFD controller 192 receives an FDFD scheduling frame and controls the network interface device 162 to participate in an forward/reverse FDFD operation, according to an embodiment. As another illustrative example, the FDFD controller 192 receives an FDFD announcement frame and controls the network interface device 162 to participate in a multi-station FDFD operation, according to an embodiments.

In an embodiment, the FDFD controller 192 is implemented by a processor (not shown) configured to execute machine readable instructions stored in a memory device (not shown) such as a RAM, a read ROM, a flash memory, etc. In another embodiment, the FDFD controller 192 includes a hardware state machine (not shown). The processor and/or the hardware state machine are configured analyze FDFD operation information frames and to control the network interface device 162 to participate in FDFD operations using information in the FDFD operation information frames, according to some embodiments.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In some embodiments, the MAC processor 166 includes an FDFD operation information frame generator similar to the FDFD operation information frame generator 142 described above, and the MAC processor 126 includes an FDFD controller similar to the FDFD controller 192 described above.

Figure 2A:
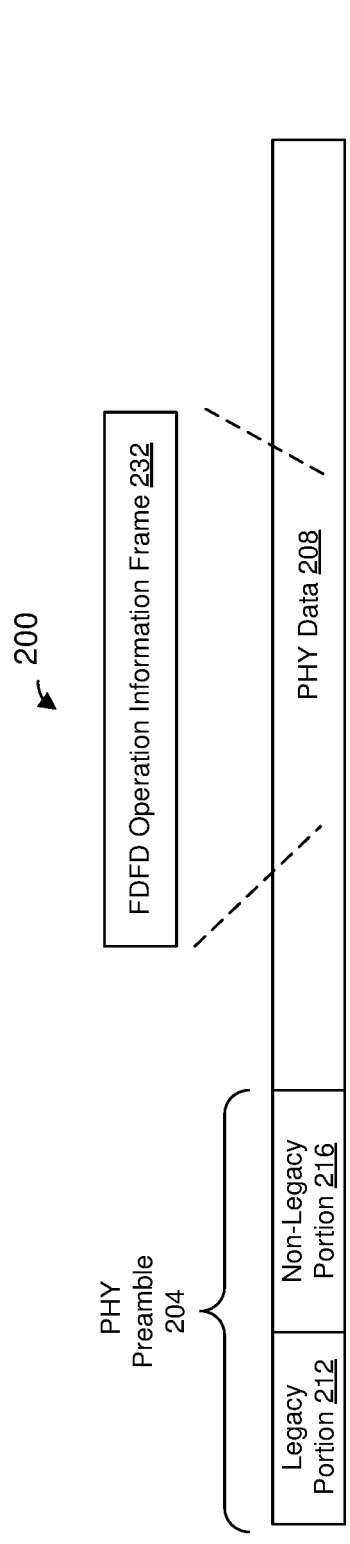
FIG. 2A is a diagram of an example physical layer (PHY) data unit that includes FDFD operation information for an FDFD operation in the example WLAN of FIG. 1, according to an embodiment.

FIG. 2A is a diagram of an example PPDU 200 that includes a FDFD operation information frame, according to an embodiment. The network interface device 122 (FIG. 1) is configured to generate and transmit the PPDU 200 to one or more client stations 154 (e.g., the client station 154-1), according to an embodiment. The network interface device 162 (FIG. 1) is configured to process the PPDU 200 and extract the FDFD operation information frame, according to an embodiment.

The PPDU 200 may occupy a 20 MHz bandwidth or another suitable bandwidth. Data units similar to the PPDU 200 occupy other suitable bandwidths that correspond to an aggregation of multiple sub-channels (e.g., each having a 20 MHz bandwidth or another suitable bandwidth), in other embodiments.

The PPDU 200 includes a PHY preamble 204 and a PHY data portion 208. The PHY preamble 204 includes a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200. The non-legacy portion 216 includes information regarding the PHY data portion 208, such as a modulation used for the PHY data portion 208, an encoding rate used for the PHY data portion 208, etc. In some embodiments, the legacy portion 212 is omitted.

In an embodiment, the PPDU 200 is a single-user (SU) PHY data unit transmitted by the AP 114 to one of the client stations 154. In another embodiment, the PPDU 200 is a downlink multi-user (MU) PHY data unit in which the AP transmits independent data streams to multiple client stations 154 using respective sets of OFDM tones and/or spatial streams allocated to the client stations 154.

Figure 2B:
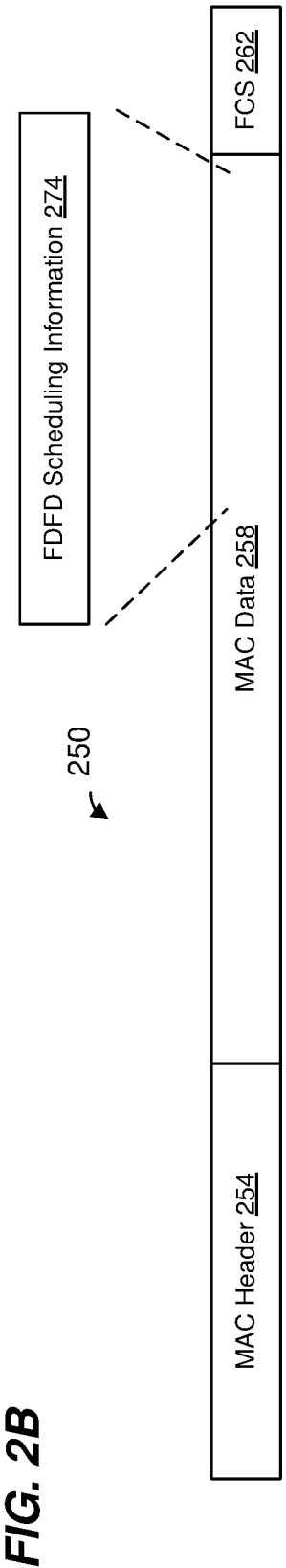
FIG. 2B is a block diagram of an example media access control layer (MAC) layer data unit that includes FDFD operation information for an FDFD operation in the example WLAN of FIG. 1, and which is included in the example PHY data unit of FIG. 2A, according to an embodiment.

The PHY data portion 208 includes an FDFD operation information frame 232. FIG. 2B is a diagram of an example FDFD operation information frame 250 that is included in the PPDU 200 of FIG. 2A (e.g., as the FDFD operation information frame 232), according to an embodiment. The network interface device 122 (FIG. 1) is configured to generate (e.g., the MAC processor 126 generates, the FDFD operation information frame generator 142 generates, etc.) the FDFD operation information frame 250, according to an embodiment.

The FDFD operation information frame 250 includes a MAC header 254, a MAC data portion 258, and a frame check sequence (FCS) field 262. In some embodiments and/or scenarios, the MAC data portion 258 is omitted and FDFD operation information is included in the MAC header 254. In some embodiments and/or scenarios, the MAC data portion 258 and the FCS field 262 are omitted.

The MAC header 254 includes a plurality of address fields (not shown) including a transmitter address (TA) field that includes an address of a first communication device that transmits the FDFD operation information frame 250 and a receiver address (RA) field that includes an address of a second communication device to which the FDFD operation information frame 250 is transmitted. In an embodiment in which the FDFD operation information frame 250 is intended for multiple communication devices, the RA address field is set to a broadcast address, or a group address. The MAC header 254 also includes a duration field (not shown) that includes a duration value that indicates a time duration of transmission of the FDFD operation information frame 250.

The MAC data portion 258 includes FDFD scheduling information 274 regarding an FDFD operation, according to an embodiment. In another embodiment, FDFD scheduling information 274 is included in a field of the MAC header 254 and the MAC data portion 258 is omitted.

Figure 3A:
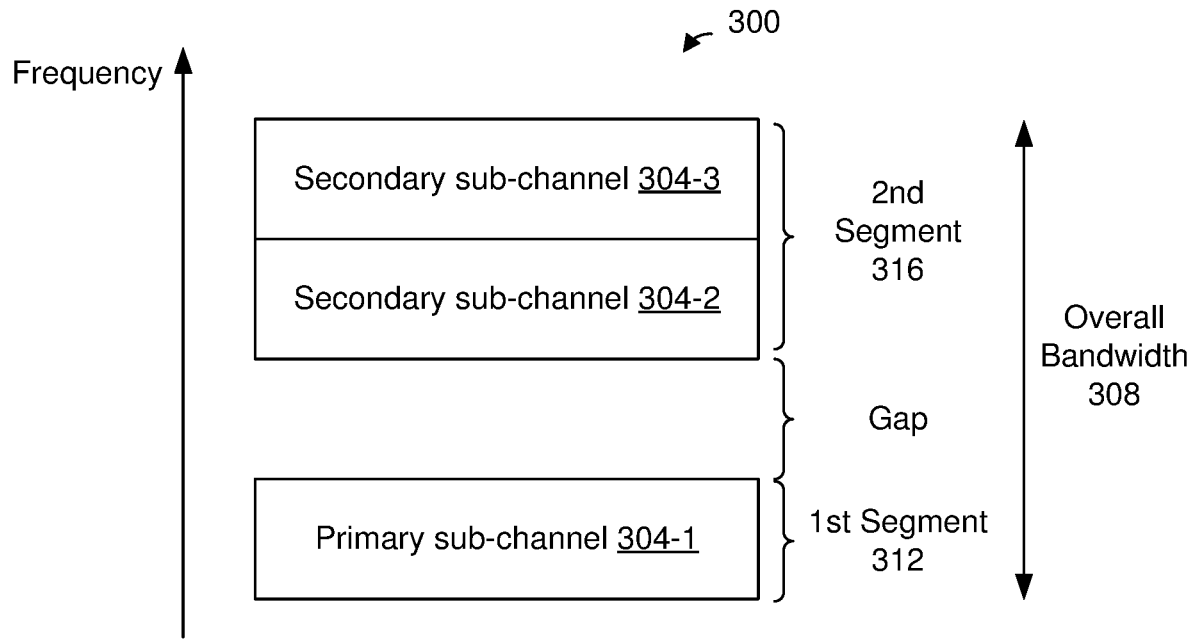
FIG. 3A is a diagram of an example communication channel used for an FDFD operation, according to an embodiment.

FIG. 3A is a diagram of an example operating channel 300 that is used in an FDFD operation, according to an embodiment. The operating channel 300 comprises a plurality of sub-channels 304 that span an overall bandwidth 308. Within the overall bandwidth 308, one of the sub-channels is "punctured", e.g., nothing is transmitted within one of the sub-channels. Although the example operating channel 300 is illustrated as spanning an overall bandwidth corresponding to four sub-channels, other punctured operating channels span overall bandwidths corresponding to other suitable numbers of sub-channels such as eight, sixteen, twenty four, thirty two, etc., according to various embodiments. Although the example operating channel 300 is illustrated as having one punctured sub-channel, other punctured operating channels include more than one punctured sub-channel depending on the overall bandwidth and such that the aggregate bandwidth of the punctured operating channel is larger than an overall bandwidth of a next smaller sized operating channel that is permitted by the wireless communication protocol, according to various embodiments. For example, if the communication protocol defines operating channels of 80 MHz and 160 MHz, a punctured operating channel spanning an overall bandwidth of 160 MHz (e.g., eight 20 MHz sub-channels) may have up to three punctured 20 MHz sub-channels, according to an embodiment.

The operating channel 300 includes a first frequency segment 312 and a second frequency segment 316 separated in frequency from the first frequency segment 312 by a gap in frequency, which corresponds to the punctured sub-channel.

In some embodiments, one sub-channel (e.g., sub-channel 304-1) within a composite channel is designated as a primary sub-channel, and other sub-channels (e.g., sub-channels 304-2 and 304-3) are designated as secondary sub-channels. A primary sub-channel generally is a common channel of operation for all devices in the WLAN, and secondary sub-channels can be aggregated with the primary channel to form wider composite channels, in some embodiments. In some embodiments, only secondary sub-channels can be punctured, i.e., the primary sub-channel cannot be punctured.

Figure 3B:
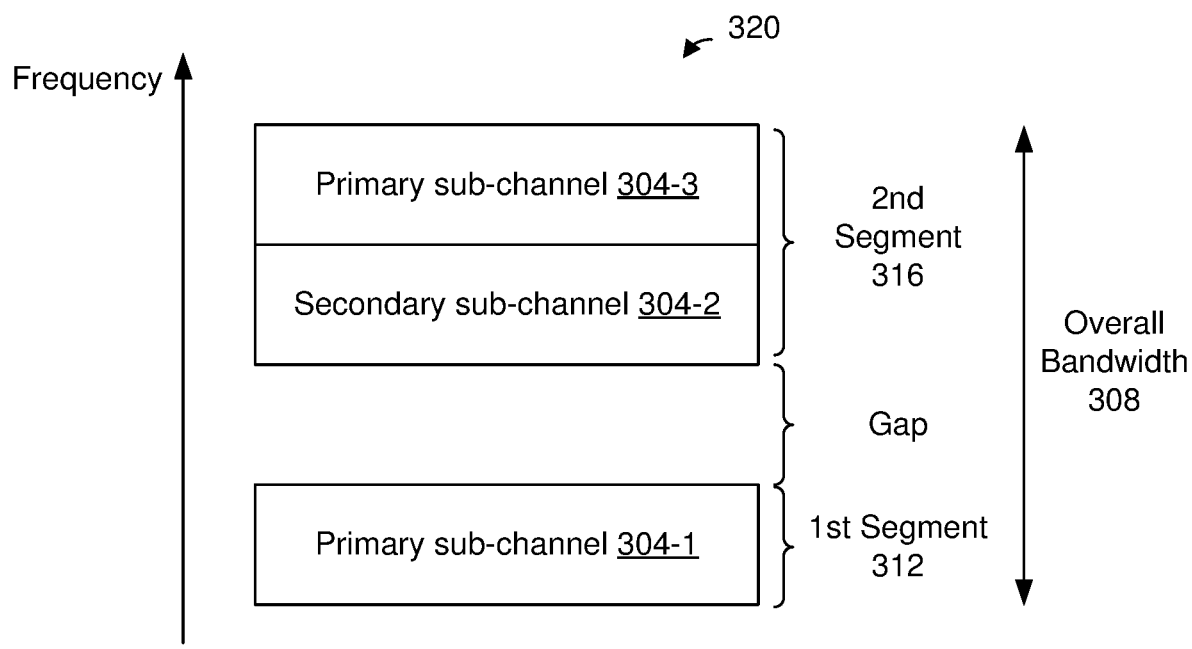
FIG. 3B is a diagram of the example communication channel of FIG. 3A with multiple primary sub-channels, according to another embodiment.

In some embodiments, the first frequency segment 312 and the second frequency segment 316 each include a respective primary channel, such as illustrated in FIG. 3B. In some embodiments in which each frequency segment includes a respective primary sub-channel, only secondary sub-channels can be punctured, i.e., the primary sub-channel cannot be punctured.

Referring now to FIGS. 3A and 3B, in various embodiments, the first frequency segment 312 and the second frequency segment 316 are used for different, simultaneous, unsynchronized communications in an FDFD operation. For example, in an uplink/downlink FDFD operation, one of the first frequency segment 312 and the second frequency segment 316 is used for downlink transmissions, whereas the other one of the first frequency segment 312 and the second frequency segment 316 is used for uplink transmissions, according to an embodiment. As another example, in a multi-station FDFD operation, one of the first frequency segment 312 and the second frequency segment 316 is used for communications with a first set of one or more communication devices, whereas the other one of the first frequency segment 312 and the second frequency segment 316 is used for communications with a second set of one or more communication devices, according to an embodiment.

Although the first frequency segment 312 and the second frequency segment 316 in FIGS. 3A and 3B are separated by a gap in frequency corresponding to a full sub-channel, in other embodiments, the gap in frequency corresponds to a bandwidth smaller than a full sub-channel.

Figure 3C:
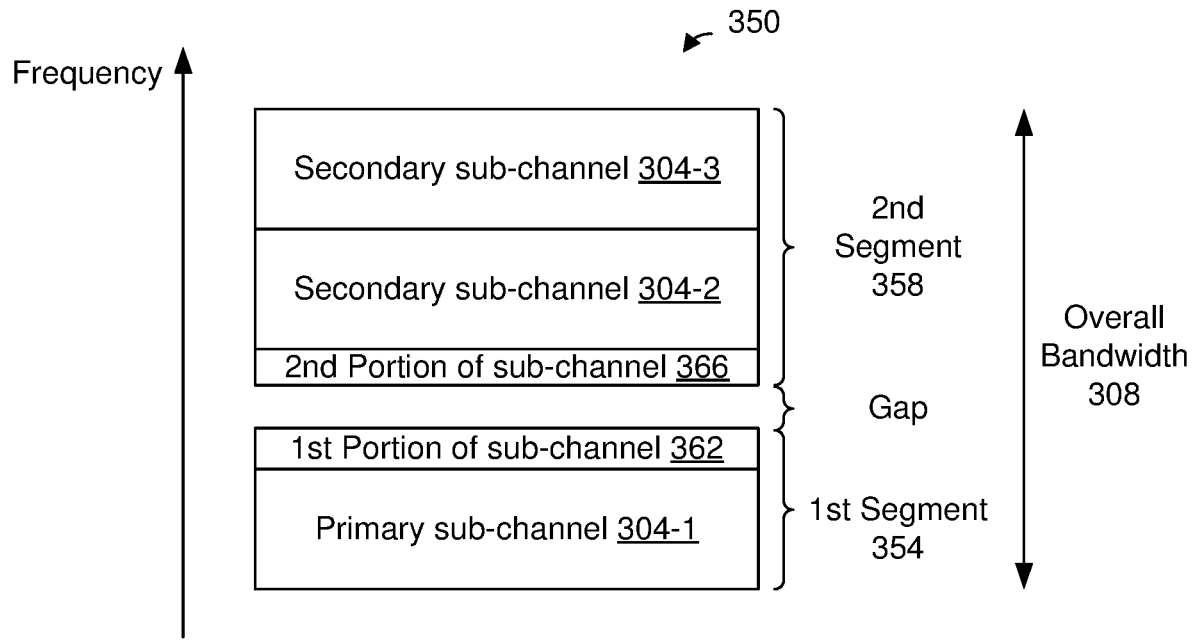
FIG. 3C is a diagram of another example communication channel used for an FDFD operation, according to another embodiment.

FIG. 3C is a diagram of another example operating channel 350 that is used in an FDFD operation, according to an embodiment. The operating channel 350 comprises the plurality of sub-channels 304. Although the example operating channel 350 is illustrated as spanning an overall bandwidth corresponding to four sub-channels, other punctured operating channels span overall bandwidths corresponding to other suitable numbers of sub-channels such as eight, sixteen, twenty four, thirty two, etc., according to various embodiments. Although the example operating channel 350 is illustrated as having one punctured sub-channel, other punctured operating channels include more than one punctured sub-channel depending on the overall bandwidth and such that the aggregate bandwidth of the punctured operating channel is larger than an overall bandwidth of a next smaller sized operating channel that is permitted by the wireless communication protocol, according to various embodiments. For example, if the communication protocol defines operating channels of 80 MHz and 160 MHz, a punctured operating channel spanning an overall bandwidth of 160 MHz (e.g., eight 20 MHz sub-channels) may have up to three punctured 20 MHz sub-channels, according to an embodiment.

The operating channel 350 includes a first frequency segment 354 and a second frequency segment 358 separated in frequency from the first frequency segment 354 by a gap in frequency. The first frequency segment 354 includes a first portion 362 of another sub-channel, and the second frequency segment 358 includes a second portion 366 of the other sub-channel. In another embodiment, the first frequency segment 354 does not include the first portion 362 of the other sub-channel, i.e., the gap in frequency includes the first portion 362 of the other sub-channel. In another embodiment, the second frequency segment 358 does not include the second portion 366 of the other sub-channel, i.e., the gap in frequency includes the second portion 366 of the other sub-channel.

In some embodiments, only secondary sub-channels can overlap with the gap in frequency, i.e., the primary sub-channel cannot overlap the gap in frequency.

Figure 3D:
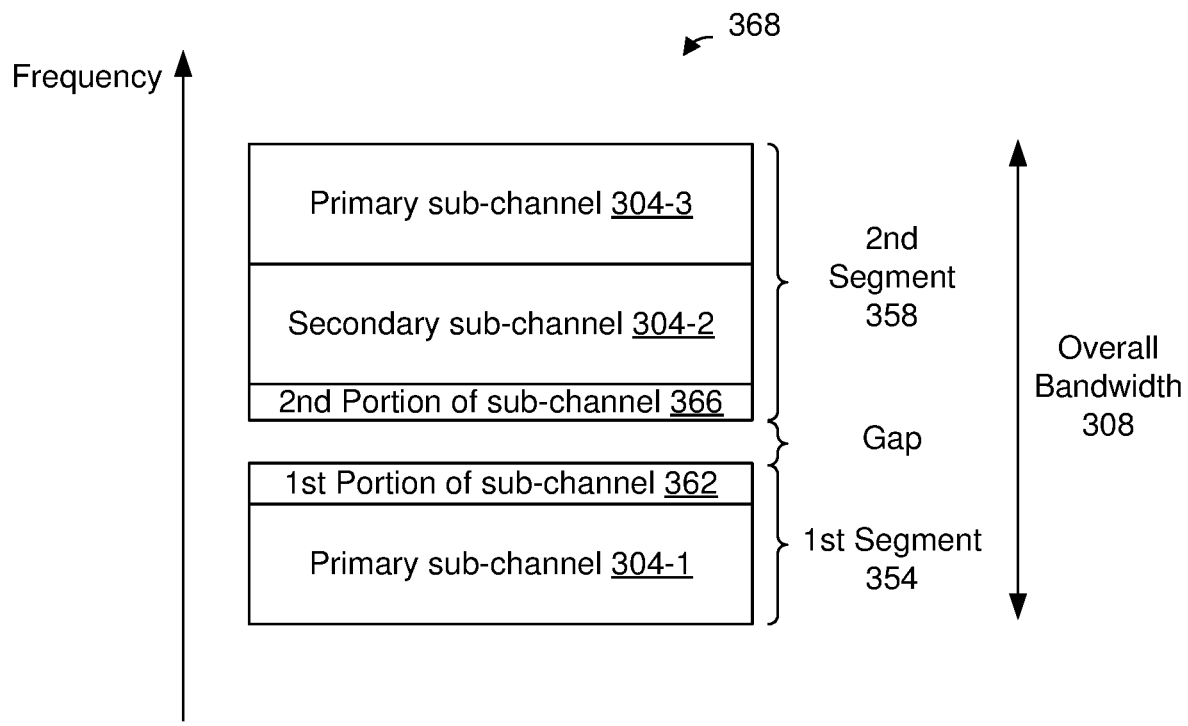
FIG. 3D is a diagram of the example punctured communication channel of FIG. 3C with multiple primary sub-channels, according to another embodiment.

In some embodiments, the first frequency segment 354 and the second frequency segment 358 each include a respective primary channel, such as illustrated in FIG. 3D. In some embodiments in which each frequency segment includes a respective primary sub-channel, only secondary sub-channels can include the gap in frequency, i.e., primary sub-channels cannot include the gap in frequency.

Referring now to FIGS. 3C and 3D, in various embodiments, the first frequency segment 354 and the second frequency segment 358 are used for different, simultaneous, unsynchronized communications in an FDFD operation. For example, in an uplink/downlink FDFD operation, one of the first frequency segment 354 and the second frequency segment 358 is used for downlink transmissions, whereas the other one of the first frequency segment 354 and the second frequency segment 358 is used for uplink transmissions, according to an embodiment. As another example, in a multi-station FDFD operation, one of the first frequency segment 354 and the second frequency segment 358 is used for communications with a first set of one or more communication devices, whereas the other one of the first frequency segment 354 and the second frequency segment 358 is used for communications with a second set of one or more communication devices, according to an embodiment.

Although the first frequency segment 354 and the second frequency segment 358 in FIGS. 3C and 3D are separated by a gap in frequency that is less than a full sub-channel, in other embodiments, the gap in frequency corresponds to a bandwidth greater than a full sub-channel.

Figure 3E:
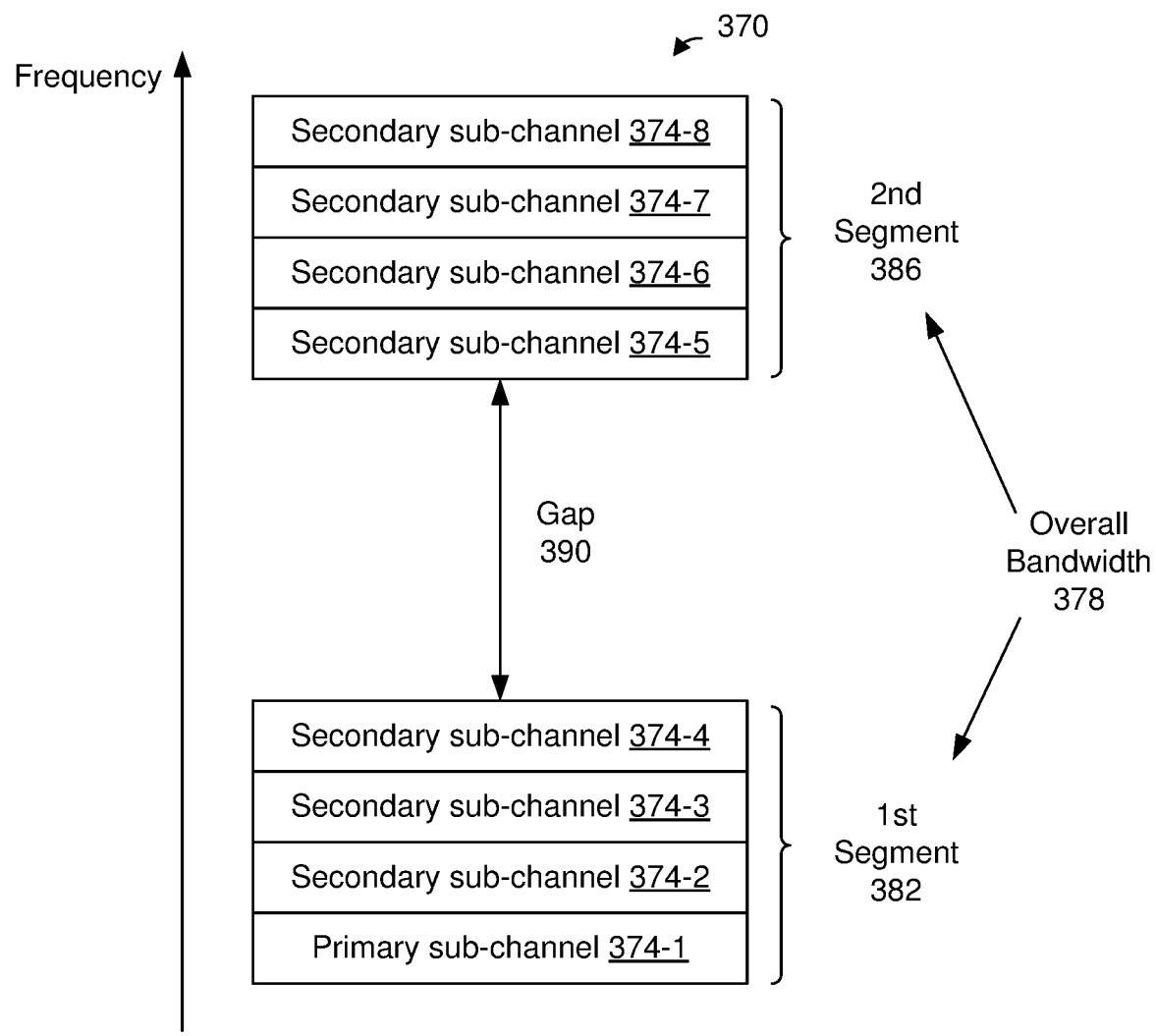
FIG. 3E is a diagram of another example communication channel used for an FDFD operation, according to another embodiment.

FIG. 3E is a diagram of another example operating channel 370 that is used in an FDFD operation, according to an embodiment. The operating channel 370 comprises a plurality of sub-channels 374 that span an overall bandwidth 378. The overall bandwidth 378 comprises a first frequency segment 382 and a second frequency segment 386 separated from the first frequency segment 382 by a gap in frequency 390. In an embodiment, the two segments 382 are within a same RF band. In another embodiment, the segments 382 are in different RF bands. A future WLAN protocol, now under development, may permit multi-band operation in which a WLAN can use spectrum in multiple RF bands at the same time. For example, the future WLAN protocol may permit aggregation of spectrum in a first RF band with spectrum in a second RF band to form a composite communication channel.

Optionally, the first frequency segment 382 and/or the second frequency segment 386 includes one or more punctured sub-channels, e.g., the punctured sub-channel(s) are not used for the operating channel 370.

Although the example operating channel 370 is illustrated as spanning an overall bandwidth 378 corresponding to eight sub-channels, other operating channels span overall bandwidths corresponding to other suitable numbers of sub-channels such as sixteen, twenty four, thirty two, etc., according to various embodiments. Although the first frequency segments 382 and the second frequency segment 386 are illustrated as including a same number of sub-channels, the first frequency segments 382 and the second frequency segment 386 include different numbers of sub-channels in other embodiments.

Figure 3F:
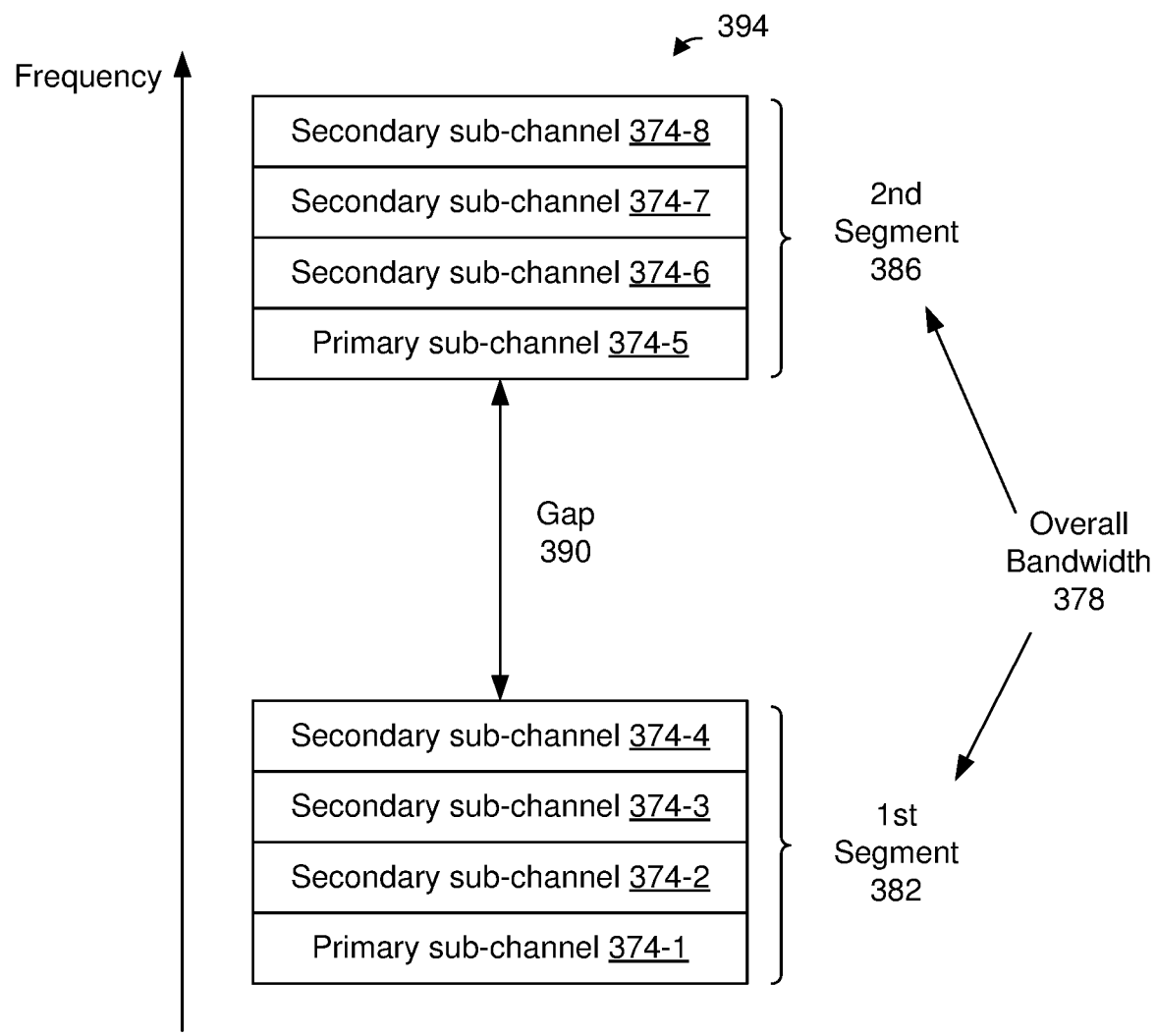
FIG. 3F is a diagram of the example communication channel of FIG. 3E with multiple primary sub-channels, according to another embodiment.

In some embodiments, first frequency segment 382 and the second frequency segment 386 each include a respective primary channel, such as illustrated in FIG. 3F. In some embodiments in which each frequency segment includes a respective primary sub-channel, only secondary sub-channels can be punctured, i.e., the primary sub-channel cannot be punctured.

Referring now to FIGS. 3E and 3F, in various embodiments, the first frequency segment 382 and the second frequency segment 386 are used for different, simultaneous, unsynchronized communications in an FDFD operation. For example, in an uplink/downlink FDFD operation, one of the first frequency segment 382 and the second frequency segment 386 is used for downlink transmissions, whereas the other one of the first frequency segment 382 and the second frequency segment 386 is used for uplink transmissions, according to an embodiment. As another example, in a multi-station FDFD operation, one of the first frequency segment 382 and the second frequency segment 386 is used for communications with a first set of one or more communication devices, whereas the other one of the first frequency segment 382 and the second frequency segment 386 is used for communications with a second set of one or more communication devices, according to an embodiment.

Each frequency segment of an operating channel such as shown in FIGS. 3A-F comprises at least one sub-channel. In some embodiments, at least one frequency segment of an operating channel such as shown in FIGS. 3A-F comprises less than one sub-channel. In various embodiments, different frequency segments of an operating channel such as shown in FIGS. 3A-F comprise different numbers of sub-channels or the same number of sub-channels.

In various embodiments described below, a first communication device simultaneously transmits multiple MAC layer data units to a second communication device via different frequency segments, separated by a gap in frequency, of a communication channel. Illustrative examples of communication channels having different frequency segments separated by a gap in frequency were described above with reference to FIGS. 3A-F, and the first communication device may simultaneously transmit multiple MAC layer data units to the second communication device via such communication channels, as well as other suitable communication channels.

Figure 4:
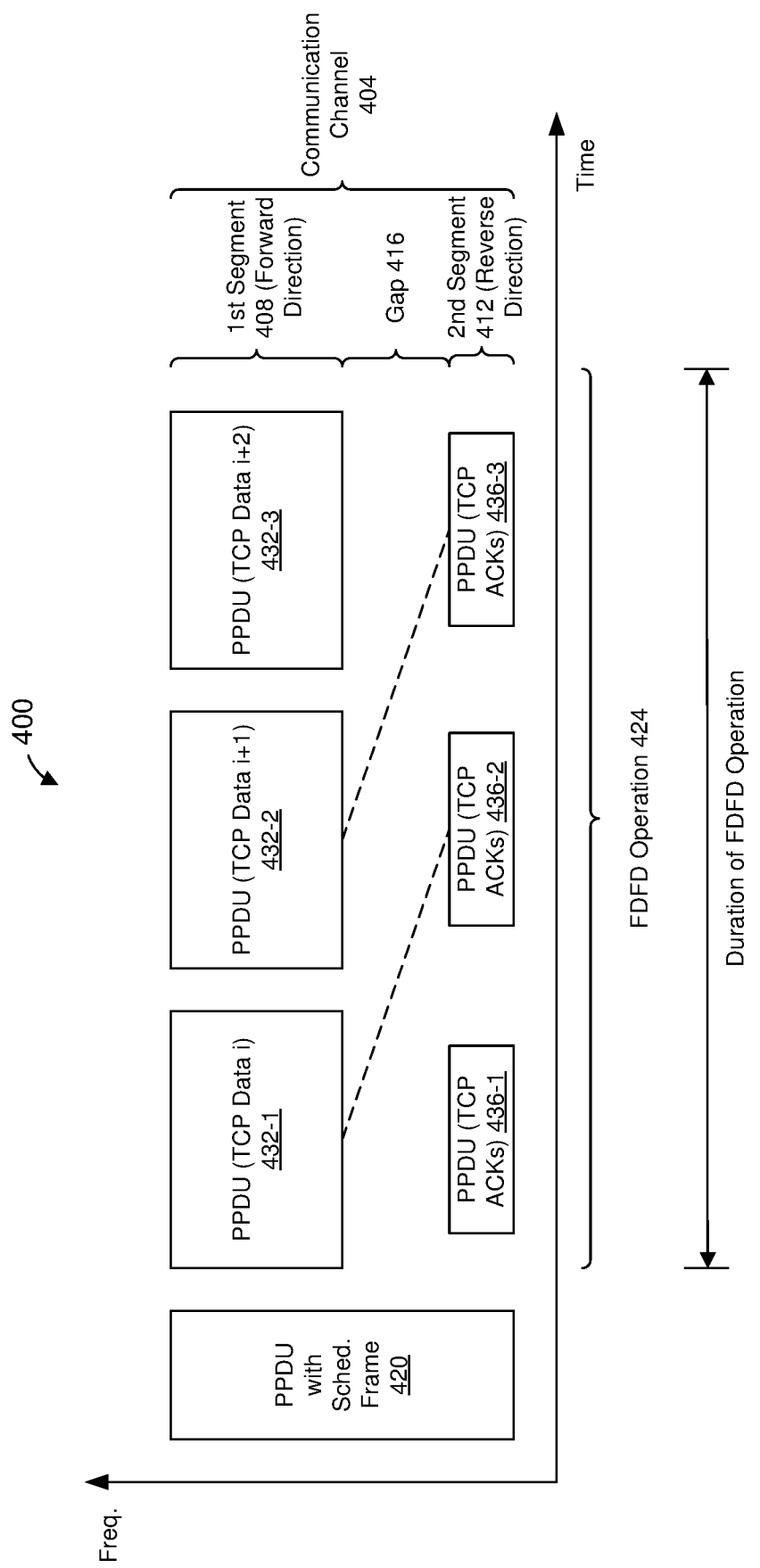
FIG. 4 is a diagram of an example communication exchange that involves an example FDFD operation, according to an embodiment.

FIG. 4 is a diagram of an example communication exchange 400 in a WLAN involving an FDFD operation, according to an embodiment. In the communication exchange 400, a first communication device communicates with one or more second communication devices via a communication channel 404. In various embodiments, the communication channel 404 comprises a communication channel such as described above with reference to FIGS. 3A-F, or any other suitable communication channel suitable for FDFD operations.

In the communication exchange 400, the first communication device transmits to one or more second communication devices in a first frequency segment 408, and the one or more second communication devices transmit to the first communication device in a second frequency segment 412. The first frequency segment 408 is separated from the second frequency segment 412 by a gap in frequency 416.

The first frequency segment 408 corresponds to a forward (or downlink) direction and the second frequency segment 412 corresponds to a reverse (or uplink) direction, according to an embodiment. The first communication device (e.g., a MAC processor of the first communication device) has knowledge of forward/reverse (or downlink/uplink) traffic flows, load ratio(s), subchannel availability information, etc., and uses the knowledge of such information to establish an FDFD operation, according to an embodiment. For example, the first communication device (e.g., a MAC processor of the first communication device) determines one or more of i) a frequency bandwidth of the first frequency segment 408, ii) a frequency bandwidth of the second frequency segment 412, iii) a frequency bandwidth of the gap 416, a duration of the FDFD operation, etc., using knowledge of the forward/reverse (or downlink/uplink) traffic flows, load ratio(s), subchannel availability information, etc.

In an embodiment, the first communication device is the AP 114 of FIG. 1 and the one or more second communication devices are one or more of the client stations 154 of FIG. 1. For ease of explanation, FIG. 4 is described in the context of the first communication device being an AP and the one or more second communication devices being one or more client stations. However, in other embodiments, the first communication device and/or the one or more second communication devices are other suitable communication devices. For example, in another embodiment, the first communication device is the client station 154-1 and the one or more second communication devices is the AP 114. In another embodiment, the first communication device is the client station 154-1 and the one or more second communication devices is the client station 154-2. In other embodiments, the first communication device and the one or more second communication devices are other suitable communication devices operating in another suitable wireless communication network other than the WLAN 110 of FIG. 1.

In an embodiment, the AP 114 transmits a PPDU 420 that includes a FDFD scheduling frame to one or more client stations 154 to provide the one or more client stations 154 with information regarding a forward/reverse FDFD operation 424. The FDFD scheduling frame (an example of an FDFD operation information frame discussed above) in the PPDU 420 includes one of, or any suitable combination of two or more of: i) an indication of a duration of the forward/reverse FDFD operation 424, ii) an indication of a TXOP corresponding to the forward/reverse FDFD operation 424, iii) one or more indications of one or more of a) the first frequency segment 408 for a downlink (or forward) direction, b) the second frequency segment 412 for an uplink (or reverse) direction, c) the gap in frequency 416, iv) ordering information that indicates an order in which client stations 154 are to transmit in the uplink (or reverse) direction during the forward/reverse FDFD operation 424, v) time slot information that indicates time slots in which client stations 154 are to transmit in the uplink (or reverse) direction during the forward/reverse FDFD operation 424, vi) priority information that indicates respective priorities of client stations 154 for transmitting in the uplink (or reverse) direction during the forward/reverse FDFD operation 424, vii) PHY transmission mode information that indicates whether client stations 154 are to transmit in the second segment 412 using a single user (SU) mode or a trigger-based mode in which a trigger frame from the AP 114 prompts one or more client stations to transmit, etc.

In an embodiment, the FDFD scheduling frame in the PPDU 420 spans the communication channel 404. In another embodiment, the FDFD scheduling frame spans a single subchannel, and the PPDU 420 includes a plurality of instances of the FDFD scheduling frame in respective subchannels in the communication channel 404. In another embodiment, respective instances of the FDFD scheduling frame are included in respective PPDUs that span respective subchannels, e.g., FDFD scheduling frames are included in duplicate PPDUs in respective subchannels.

In another embodiment, the PPDU 420 is transmitted in only a primary subchannel (or duplicates of the PPDU 420 are transmitted in multiple primary subchannels) within the communication channel 404.

After receiving the FDFD scheduling frame in the PPDU 420, the one or more client stations 154 use (e.g., MAC processors of the one or more client stations 154 use) information in the FDFD scheduling frame to determine one or more of i) the first frequency segment 408 in which the one or more client stations 154 will receive PPDUs from the AP 114 during the FDFD operation 424, ii) the second frequency segment 412 in which the one or more client stations 154 can transmit during the FDFD operation 424, iii) the duration of the FDFD operation 424, iv) a duration of a TXOP corresponding to the FDFD operation 424, etc., according to various embodiments.

In embodiments in which the FDFD scheduling frame includes scheduling information such as ordering information, time slot information, and/or priority information, each of the one or more client stations 154 uses (e.g., MAC processor uses) such scheduling information to determine when the client station 154 is to transmit in the second frequency segment during the FDFD operation 424. For example, in one embodiment, the FDFD scheduling frame includes priority information that indicates respective channel access parameters to be used by respective client stations 154 for contention-based access to a channel medium when transmitting in the second frequency segment 412. One example of a channel access parameter is a minimum contention window (CWmin) parameter defined by the IEEE 802.11 Standard, which specifies a maximum value of a contention window from which an initial backoff time period is randomly (or pseudorandomly) selected. Client stations 154 using shorter CWmin values generally have a higher chance of gaining access to a channel medium as compared to client stations 154 using longer CWmin values. Thus, when the AP 114 assigns (e.g., the network interface 122 assigns, the MAC processor 126 assigns, etc.) different CWmin values to different client stations 154, the different client stations 154 have different priorities to access the second frequency segment 412. Another example of a channel access parameter is an arbitration interface spacing (AIFS) defined by the IEEE 802.11 Standard, which specifies a fixed wait time between when a channel medium becomes busy and when a backoff period begins. Client stations 154 using shorter AIFS values generally have a higher chance of gaining access to a channel medium as compared to client stations 154 using longer AIFS values. Thus, when the AP 114 assigns (e.g., the network interface 122 assigns, the MAC processor 126 assigns, etc.) different AIFS values to different client stations 154, the different client stations 154 have different priorities to access the second frequency segment 412.

In one embodiment, a client station 154 maintains two sets of channel access parameters: i) a first set of channel access parameters for PPDUs to be transmitted that are not specific to the FDFD operation 424, and ii) a second set of channel access parameters for PPDUs to be transmitted that are specific to the FDFD operation 424. For example, the client station 154 maintains a first CWmin parameter for PPDUs to be transmitted that are not specific to the FDFD operation 424, and a second CWmin parameter for PPDUs to be transmitted that are specific to the FDFD operation 424. As another example, the client station 154 maintains a first AIFS parameter for PPDUs to be transmitted that are not specific to the FDFD operation 424, and a second AIFS parameter for PPDUs to be transmitted that are specific to the FDFD operation 424.

In an embodiment, PPDUs that are specific to the FDFD operation 424 are PPDUs that are transmitted by a client station 154 in response to PPDUs that are received from the AP 114 during the FDFD operation 424, whereas PPDUs that are not specific to the FDFD operation 424 are PPDUs that are not in response to PPDUs that are received from the AP 114 during the FDFD operation 424.

In an embodiment, the second set of channel access parameters correspond to a higher chance of gaining access to the channel medium as compared to the first set of channel access parameters such that transmission of PPDUs that are not specific to the FDFD operation 424 during the FDFD operation 424 are delayed (e.g., until after transmission of PPDUs that are specific to the FDFD operation 424) or prohibited during the FDFD operation 424, according to some embodiments.

In an embodiment in which the FDFD scheduling frame includes PHY transmission mode information that indicates whether client stations 154 are to transmit in the second segment 412 using the SU mode or the trigger-based mode, the one or more client stations 154 use (e.g., MAC processors of the one or more client stations 154 use) the PHY transmission mode information a PHY mode in which the one or more client stations 154 are to transmit in the second frequency segment 412.

During the forward/reverse FDFD operation 424, the AP 114 transmits PPDUs 432 to the one or more client stations 154 via the first frequency segment 408. In an embodiment, one or more of the PPDUs 432 are downlink (DL) multi-user (MU) PPDUs that include different data for different client stations 154. For example, the MU PPDUs 432 are transmitted using orthogonal frequency division multiple access (OFDMA) techniques and/or using MU multiple input, multiple output (MU-MIMO) techniques. In another embodiment, one or more of the PPDUs 432 are SU PPDUs that include data for only a single client station 154. In another embodiment, all of the PPDUs 432 are SU PPDUs that are addressed to a same single client station 154. In another embodiment, at least some of the PPDUs 432 are SU PPDUs that are addressed to different client stations 154.

Also during the forward/reverse FDFD operation 424, the one or more client stations 154 transmit PPDUs 436 to the AP 114 via the second frequency segment 412, where transmission of at least some of the PPDUs 436 overlap in time with transmission of at least some of the PPDUs 432. In an embodiment, one or more of the PPDUs 436 are trigger-based PPDUs that are transmitted in response to receiving trigger frames from the AP 114. In an embodiment, one or more of the PPDUs 436 are uplink (UL) MU PPDUs (which are trigger-based PPDUs) that include simultaneous transmissions from different client stations 154. For example, the UL MU PPDUs 436 are transmitted using UL OFDMA techniques and/or using UL MU-MIMO techniques. In another embodiment, one or more of the PPDUs 436 are SU PPDUs that include a transmission from only a single client station 154. In another embodiment, all of the PPDUs 436 are SU PPDUs from a same single client station 154. In another embodiment, at least some of the PPDUs 436 are SU PPDUs from different client stations 154.

When the PPDUs 436 are trigger-based PPDUs, the AP 114 transmits a trigger frame in the first frequency segment 408, and a trigger-based PPDU 436 is transmitted in the second frequency segment 412 in response to the trigger frame, according to an embodiment. In another embodiment, when the PPDUs 436 are trigger-based PPDUs, the AP 114 transmits a trigger frame in the second frequency segment 412 (not shown), and a trigger-based PPDU 436 is transmitted in the second frequency segment 412 in response to the trigger frame, according to an embodiment.

In an illustrative embodiment, the PPDUs 432 transmitted in the first frequency segment 408 include transmission control protocol (TCP) data units (referred to herein as "TCP segments"), and the PPDUs 436 transmitted in the second frequency segment 412 include TCP acknowledgments (ACKs) of the TCP segments transmitted in the first frequency segment 408. For example, the PPDU 436-1 includes one or more TCP ACKs for one or more TCP segments (not shown in FIG. 4) transmitted prior to the PPDU 420; the PPDU 436-2 includes one or more TCP ACKs for one or more TCP segments included in the PPDU 432-1; the PPDU 436-3 includes one or more TCP ACKs for one or more TCP segments included in the PPDU 432-2; and one or more TCP ACKs (not shown in FIG. 4) for one or more TCP segments included in the PPDU 432-3 are transmitted after the FDFD operation 424.

Although the FDFD operation 424 was described in the context of transmitting TCP segments and TCP ACKs, the PPDUs 432 and the PPDUs 436 include other suitable information in other embodiments. As merely an illustrative example, the PPDUs 436 include use information other than, or in addition to, ACKs of data units included in the PPDUs 432, according to an embodiment.

Figure 5:
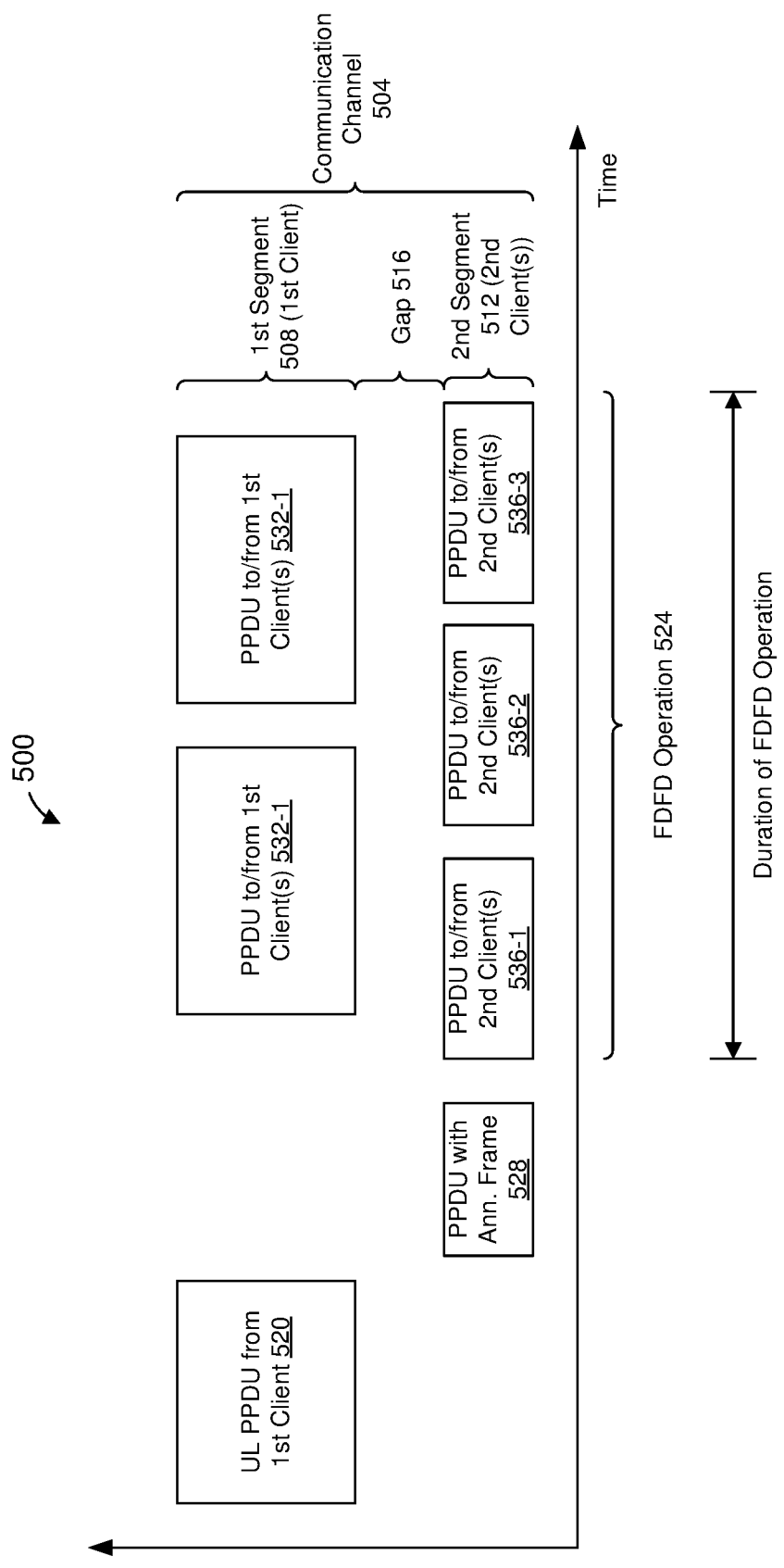
FIG. 5 is a diagram of another example communication exchange that involves another example FDFD operation, according to another embodiment.

FIG. 5 is a diagram of an example communication exchange 500 in a WLAN involving an FDFD operation, according to an embodiment. In the communication exchange 500, a first communication device communicates with multiple second communication devices via a communication channel 504. In various embodiments, the communication channel 504 comprises a communication channel such as described above with reference to FIGS. 3A-F, or any other suitable communication channel suitable for FDFD operations.

In the communication exchange 500, the first communication device communicates with a second communication device in a first frequency segment 508, and communicates with one or more third communication devices in a second frequency segment 512. The first frequency segment 508 is separated from the second frequency segment 512 by a gap in frequency 516.

The first communication device (e.g., a MAC processor of the first communication device) has knowledge of a frequency bandwidth that the second communication device is using to transmit to the first communication device, subchannel availability information, etc., and uses the knowledge of such information to establish an FDFD operation, according to an embodiment. For example, the first communication device (e.g., a MAC processor of the first communication device) determines one or more of i) a frequency bandwidth of the first frequency segment 508, ii) a frequency bandwidth of the second frequency segment 512, iii) a frequency bandwidth of the gap 516, a duration of the FDFD operation, etc., using knowledge of the frequency bandwidth that the second communication device is using to transmit to the first communication device, subchannel availability information, etc.

In an embodiment, the first communication device is the AP 114 of FIG. 1, the second communication device is one of the client statins 154 of FIG. 1, and the one or more third communication devices are one or more other client stations 154 of FIG. 1. For ease of explanation, FIG. 5 is described in the context of the first communication device being an AP and the second and third communication devices being one or more client stations. However, in other embodiments, the first, second, and/or third communication devices are other suitable communication devices. For example, in another embodiment, the first communication device is a first client station 154-1, the second communication device is the client station 154-2, and the one or more third communication devices are one or more other client stations 154. In other embodiments, the first, second, and third communication devices are other suitable communication devices operating in another suitable wireless communication network other than the WLAN 110 of FIG. 1.

In an embodiment, the AP 114 receives a PPDU 520 from a first client station 154. Based on at least the PPDU 520, the AP 114 determines (e.g., the MAC processor 126 determines) that the first client station 154 is using the first frequency segment 508 to transmit to the AP 114, according to an embodiment. For example, the AP 114 determines, using information in a PHY preamble of the PPDU 520, that the PPDU 520 spans the first frequency segment 508.

Additionally, the AP 114 determines that a frequency bandwidth corresponding to the second frequency segment 512 and the frequency gap 516 is idle. For example, the AP 114 uses (e.g., the network interface device 122 uses) one or more of i) a channel sensing mechanism, ii) a clear channel assessment mechanism, etc., to determine that the frequency bandwidth corresponding to the second frequency segment 512 and the frequency gap 516 is idle, according to an embodiment.

In response to determining that i) the first client station 154 is using the first frequency segment 508 to transmit to the AP 114, and ii) the frequency bandwidth corresponding to the second frequency segment 512 and the frequency gap 516 is idle, the AP 114 determines (e.g., the network interface device 122 determines, the MAC processor 126 determines, etc.) to establish a multi-station FDFD operation 524 in which i) communications with the first client station 154 will use the first frequency segment 508, ii) communications with one or more second client stations 154 will use the second frequency segment 512, and iii) the frequency gap 516 will not be used for communications with any of the client stations 154.

In response to determining to establish the multi-station FDFD operation 524, the AP 114 transmits a PPDU 528 that includes a FDFD announcement frame to one or more client stations 154 to provide the one or more client stations 154 with information regarding the multi-station FDFD operation 524. The FDFD announcement frame (an example of an FDFD operation information frame discussed above) in the PPDU 528 includes one of, or any suitable combination of two or more of: i) an indication of a duration of the multi-station FDFD operation 524, ii) an indication of a TXOP corresponding to the multi-station FDFD operation 524, iii) one or more indications of one or more of a) the first frequency segment 508 for communications with the first client station 154, b) the second frequency segment 412 for communications with the one or more second client stations 154, c) the gap in frequency 516, iv) ordering information that indicates an order in which second client stations 154 are to transmit in the second frequency segment 512 during the multi-station FDFD operation 524, v) time slot information that indicates time slots in which second client stations 154 are to transmit in the second frequency segment 512 during the multi-station FDFD operation 524, vi) priority information that indicates respective priorities of second client stations 154 for transmitting in the second frequency segment 512 during the multi-station FDFD operation 524, etc.

In an embodiment, the FDFD announcement frame in the PPDU 528 spans the second frequency segment 512. In another embodiment, the FDFD announcement frame spans a single subchannel, and the PPDU 528 includes a plurality of instances of the FDFD announcement frame in respective subchannels in the second frequency segment 512. In another embodiment, respective instances of the FDFD announcement frame are included in respective PPDUs that span respective subchannels in the second frequency segment 512, e.g., FDFD announcement frames are included in duplicate PPDUs in respective subchannels in the second frequency segment 512.

In an embodiment, the FDFD announcement frame in the PPDU 528 spans the entire communication channel 504. In another embodiment, the FDFD announcement frame spans a single subchannel, and the PPDU 528 includes a plurality of instances of the FDFD announcement frame in respective subchannels in the communication channel 504. In another embodiment, respective instances of the FDFD announcement frame are included in respective PPDUs that span respective subchannels of the communication channel 504, e.g., FDFD announcement frames are included in duplicate PPDUs in respective subchannels.

In another embodiment, the PPDU 528 is transmitted in only a primary subchannel (or duplicates of the PPDU 528 are transmitted in multiple primary subchannels) within the communication channel 504.

After receiving the FDFD announcement frame in the PPDU 528, the one or more second client stations 154 use (e.g., MAC processors of the one or more client stations 154 use) the information in the FDFD announcement frame to determine one or more of i) the first frequency segment 508 in which the first client station 154 will communicate with the AP 114 during the FDFD operation 524, ii) the second frequency segment 512 in which the one or more second client stations 154 can communicate with the AP 114 during FDFD operation 524, iii) the duration of the FDFD operation 524, iv) a duration of a TXOP corresponding to the FDFD operation 524, etc., according to various embodiments.

During the multi-station FDFD operation 524, the AP 114 and the first client station 154 communicate via the first frequency segment 508. For example, the first client station 154 transmits one or more PPDUs 532 to the AP 114 and/or the AP 114 transmits one or more PPDUs 532 to the first client station via the first frequency segment 508. In an embodiment, one or more of the PPDUs 532 are DL PPDUs that include data for the first client station 154. In another embodiment, one or more of the PPDUs 532 are UL PPDUs that include data for the AP 114. In another embodiment, one or more of the PPDUs 532 include trigger frames from the AP 114 to prompt trigger-based PPDUs from the first client station 154, and one or more of other PPDUs 532 are trigger-based PPDUs responsive to the one or more trigger frames from the AP 114.

Additionally, during the multi-station FDFD operation 524, the AP 114 and the one or more second client stations 154 communicate via the second frequency segment 512. For example, one or more second client stations 154 transmits one or more PPDUs 536 to the AP 114 and/or the AP 114 transmits one or more PPDUs 536 to the one or more second client stations via the second frequency segment 512.

In an embodiment, one or more of the PPDUs 536 are SU PPDUs from individual client stations 154. In another embodiment, one or more of the PPDUs 532 are DL PPDUs that include data for one or more of the client stations 154. In another embodiment, one or more of the PPDUs 536 include trigger frames from the AP 114 to prompt trigger-based PPDUs from one or more of the second client stations 154, and one or more of other PPDUs 536 are trigger-based PPDUs responsive to the one or more trigger frames from the AP 114. In an embodiment, one or more of the PPDUs 536 are MU PPDUs from multiple second client stations 154. For example, the UL MU PPDUs 536 are transmitted using UL OFDMA techniques and/or using UL MU-MIMO techniques.

In some embodiments, an FDFD operation information frame such as described is a broadcast frame, e.g., a receiver address in a MAC header of the FDFD operation information frame is set to a broadcast address such that all client stations 154 that receive the FDFD operation information frame are informed of an FDFD operation.

In other embodiments, an FDFD operation information frame such as described is a multicast frame addressed to a particular group of client stations 154, e.g., a receiver address in a MAC header of the FDFD operation information frame is set to a group address such that only client stations 154 in the group are informed of an FDFD operation. In an embodiment, a client station that receives the multicast FDFD operation information frame and is not in the group indicated by the group address sets a network allocation vector (NAV) counter to a duration value indicated in a MAC header of the multicast FDFD operation information frame, and refrains from transmitting while the NAV counter is not zero. In another embodiment, a client station that receives the multicast FDFD operation information frame and is not in the group indicated by the group address sets a network allocation vector (NAV) counter to a FDFD operation duration value indicated in a MAC body portion of the multicast FDFD operation information frame, and refrains from transmitting while the NAV counter is not zero. A client station that so sets its NAV counter will refrain from transmitting during the FDFD operation corresponding to the multicast FDFD operation information frame, according to an embodiment. Use of a multicast FDFD operation information frame can allow an AP to control which client stations 154 are given access to the channel medium, for example for fairness purposes, in some embodiments.

An FDFD operation information frame can be the only MPDU in a PPDU, or the FDFD operation information frame can be included in an A-MPDU with other frames, in some embodiments. For example, referring to FIG. 4, the PPDU 420 includes an A-MPDU having the FDFD scheduling frame and one or more other frames, in an embodiment. As another example, referring to FIG. 5, the PPDU 528 includes an A-MPDU having the FDFD announcement frame and one or more other frames, in an embodiment.

Although FDFD scheduling information in embodiments described above is included in an FDFD operation information frame, in other embodiments the FDFD scheduling information is instead included as a field in a MAC header (e.g., an FDFD scheduling information field in the MAC header) of another frame, such as a data frame.

If a communication channel in which an FDFD operation is to be performed is contiguous in frequency, a field within the FDFD operation information frame (or within the FDFD operation information field within a MAC header) indicates the gap in frequency between the two frequency segments of the FDFD operation, according to an embodiment. After determining the gap in frequency, the communication device determines (e.g., the network interface determines, the MAC processor determines, etc.) the first frequency segment and the second frequency segment of the FDFD operation using knowledge of an operating channel and the determined gap. In an embodiment, another field within the FDFD operation information frame (or within the FDFD operation information field within a MAC header) indicates which frequency segment is for the forward channel and the reverse channel (e.g., for a forward/reverse FDFD operation), or which frequency segment is for the first one or more client stations and the second one or more client stations (e.g., for a multi-station FDFD operation), according to an embodiment.

Figure 6A:
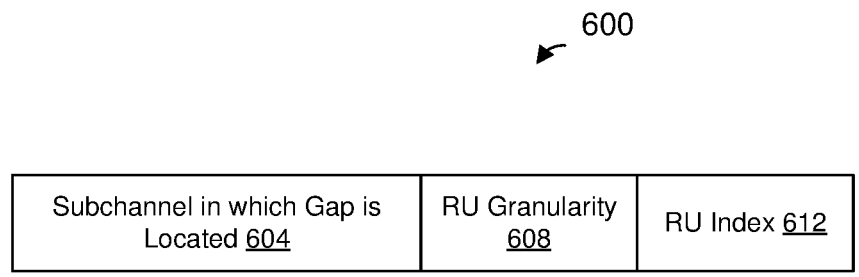
FIG. 6A is a diagram of an example subfield in the MAC layer data unit of FIG. 2B, which indicates a gap in frequency in a communication channel used for an FDFD operation, according to an embodiment.

FIG. 6A is a diagram of an example field 600 for indicating a gap in frequency between the two frequency segments of an FDFD operation when a communication channel in which an FDFD operation is to be performed is contiguous in frequency, according to an embodiment. The field 600 is included in an FDFD operation information frame (or within an FDFD operation information field within a MAC header) such as described above, according to some embodiments.

The field 600 includes a subfield 604 that indicates a subchannel in which the gap is located. For example, when a WLAN communication protocol specifies that up to sixteen subchannels can be aggregated to form an operating channel, the subfield 604 specifies a value of a four-bit subchannel index corresponding to the sixteen subchannels, i.e., respective values of the subchannel index indicate respective ones of the sixteen subchannels. In an embodiment in which the WLAN communication protocol specifies that up to sixteen subchannels can be aggregated, the subfield 604 consists of four bits.

The field 600 also includes an RU granularity subfield 608 for indicating a width of the gap. For example, the WLAN communication protocol specifies that each subchannel can be partitioned into one or more frequency RUs of different frequency bandwidths, and the RU granularity subfield 608 indicates a frequency bandwidth of the gap that corresponds to one of the RU frequency bandwidths specified by the WLAN communication protocol. In an embodiment in which the WLAN communication protocol specifies that each subchannel can be partitioned into RUs with four different frequency bandwidths, the subfield 608 consists of two bits, i.e., respective values of the subfield 608 indicate respective ones of four different frequency bandwidths.

The field 600 also includes an RU index subfield 612 for indicating an RU (within the subchannel specified within the subfield 604) that corresponds to the gap. In an embodiment, the RU index subfield 612 has a variable length. In another embodiment, the RU index subfield 612 has fixed length, with certain values reserved for certain values of the RU granularity subfield 608. For example, when the RU granularity subfield 608 indicates a bandwidth of the gap corresponds to the full bandwidth of the subchannel, there is only one RU in the subchannel; when the RU granularity subfield 608 indicates a bandwidth of the gap corresponds to one fourth of the subchannel, the RU index subfield 612 can be one of four different values; and when the RU granularity subfield 608 indicates a bandwidth of the gap corresponds to one ninth of the subchannel, the RU index subfield 612 can be one of nine different values.

Figure 6B:
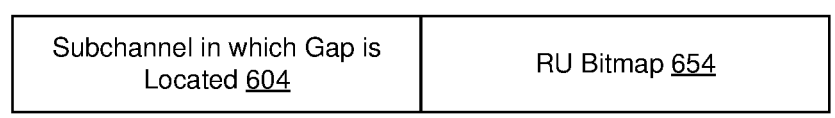
FIG. 6B is a diagram of another example subfield in the MAC layer data unit of FIG. 2B, which indicates a gap in frequency in a communication channel used for an FDFD operation, according to another embodiment.

FIG. 6B is a diagram of another example field 650 for indicating a gap in frequency between the two frequency segments of an FDFD operation when a communication channel in which an FDFD operation is to be performed is contiguous in frequency, according to another embodiment. The field 650 is included in an FDFD operation information frame (or within an FDFD operation information field within a MAC header) such as described above, according to some embodiments.

The field 650 includes the subfield 604 that indicates a subchannel in which the gap is located, as discussed above. The field 650 also includes an RU bitmap 654 that indicates one or more RUs that correspond to the gap. In an embodiment, bits in the bitmap correspond to respective RUs of a smallest frequency bandwidth specified by the WLAN communication protocol. One or more bits in the RU bitmap 654 set to a first value indicate those RUs correspond to the gap, whereas other bits in the RU bitmap 654 set to a second value indicate those RUs do not correspond to the gap, according to an embodiment.

In an illustrative embodiment, the WLAN communication protocol specifies that a smallest RU bandwidth corresponds to partitioning a 20 MHz subchannel into nine RUs, with one of the RUs corresponding to a center RU, and eight bits of the RU bitmap 654 correspond to eight RUs other than the center RU, i.e., none of the bits correspond to the center RU. In such an embodiment, one or more bits in the RU bitmap 654 set to a first value indicate those RUs correspond to the gap, whereas other bits in the RU bitmap 654 set to a second value indicate those RUs do not correspond to the gap, where the center RU is assumed to have a same bit value of a bit in the RU bitmap 654 corresponding to a particular RU adjacent to the center RU, according to an embodiment. In an embodiment, setting all of the bits in the bitmap 654 to a same value indicates that the center RU is the only RU corresponding to the gap.

Figure 7:
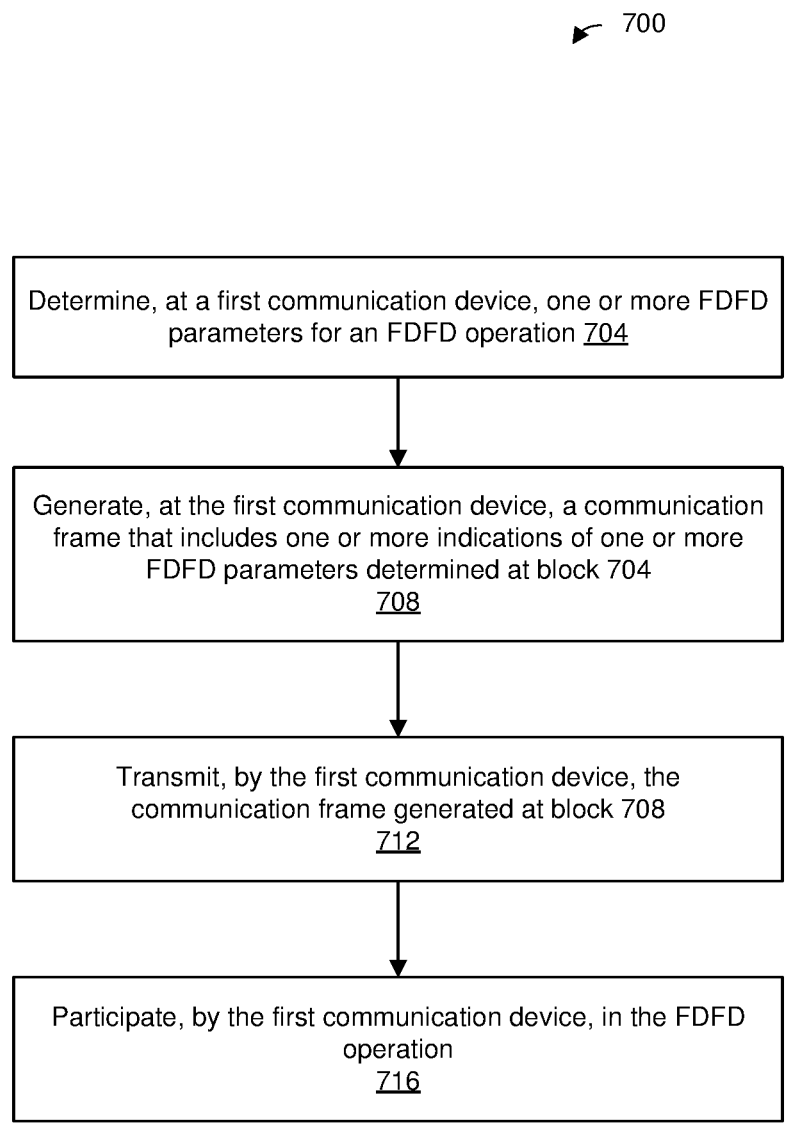
FIG. 7 is a flow diagram of an example method for participating in an FDFD operation, according to an embodiment.

FIG. 7 is a flow diagram of an example method 700 for performing an FDFD operation in a WLAN, according to an embodiment. The method 700 is implemented by the AP 114 of FIG. 1, in an embodiment, and the method 700 is described with reference to FIG. 1 for ease of explanation. For example, in an embodiment, the network interface device 122 of the AP 114 is configured to implement the method 700. In other embodiments, however, the method 700 is implemented by another suitable communication and optionally in another suitable communication system. For instance, the method 700 is implemented by the client station 154-1 (e.g., by the network interface device 162 of the client station 154-1) of FIG. 1, in another embodiment. In other embodiments, the method 700 is implemented by another suitable communication optionally in a different communication network other than the WLAN 110.

In various embodiments, the method 700 is implemented with communication channels, and/or MAC and/or PHY data units such as described with reference to FIGS. 2, 3A-F, 4 and 5. In other embodiments, however, the method 700 is implemented with suitable communication channels, and/or suitable MAC and/or PHY data units different than those described with reference to FIGS. 2, 3A-F, 4 and 5.

At block 704, the AP 114 determines (e.g., the network interface 122 determines, the MAC processor 126 determines, etc.) one or more FDFD parameters for an FDFD operation to be performed. In various embodiments, the one or more FDFD parameters for the FDFD operation include one of, or any suitable combination of two or more of, i) a first frequency segment of an operating communication channel that will be used for the FDFD operation, ii) a second frequency segment of the operating communication channel that will be used for the FDFD operation and in which communications will occur simultaneously with communications in the first frequency segment, iii) a frequency gap between the first frequency segment and the second frequency segment, iv) a duration of the FDFD operation, iv) a duration of a TXOP corresponding to the FDFD operation, v) scheduling information regarding transmissions during the FDFD operation, etc. Examples of scheduling information regarding transmissions during the FDFD operation includes one of, or any suitable combination of two or more of, ordering information indicating an ordering of transmissions during the FDFD operation, time slot information for transmissions during the FDFD operation, and/or priority information for transmissions during the FDFD operation, etc., in various embodiments. In some embodiments, priority information for transmissions during the FDFD operation include, for multiple client stations 154 that are to participate in the FDFD operation, one of, or both of, i) respective AIFS values, and ii) respective CWmin values.

In an embodiment, determining the one or more FDFD parameters at block 704 comprises using one of, or any suitable combination of two or more of, i) information regarding UL data flows (such as one or more UL throughputs corresponding to one or more client stations, amount(s) of data at one or more client stations 154 to be transmitted to the AP 114, etc.), ii) information regarding DL data flows (such as one or more DL throughputs corresponding to one or more client stations, amount(s) of data at the AP 114 to be transmitted to one or client stations 154, etc.), iii) a load ratio regarding UL transmissions, iv) a load ratio regarding DL transmissions, v) channel availability information, etc. For example, determining the one or more FDFD parameters at block 704 comprises using one of, or any suitable combination of two or more of, i) information regarding UL data flows, ii) information regarding DL data flows, iii) a load ratio regarding UL transmissions, iv) a load ratio regarding DL transmissions, v) channel availability information, etc., to determine one of, or any suitable combination of two or more of, a bandwidth of the first frequency segment, a bandwidth of the second frequency segment, and a bandwidth of the gap.

In some embodiments involving multi-station FDFD operations, determining the one or more FDFD parameters at block 704 comprises using one of, or any suitable combination of two or more of, i) a bandwidth being used by a first client station 154 to transmit to the AP 114 for UL transmissions, ii) channel availability information, etc., to determine one of, or any suitable combination of two or more of, a bandwidth of the first frequency segment, a bandwidth of the second frequency segment, and a bandwidth of the gap.

At block 708, the AP 114 generates (e.g., the network interface 122 generates, the MAC processor 126 generates, the FDFD information frame generator 142 generates, etc.) a communication frame that includes one or more indications of the one or more FDFD parameters determined at block 704. In various embodiments, block 708 comprises including in the communication frame one or more indications of one of, or any suitable combination of two or more of, i) the first frequency segment of an operating communication channel that will be used for the FDFD operation, ii) the second frequency segment of the operating communication channel that will be used for the FDFD operation and in which communications will occur simultaneously with communications in the first frequency segment, iii) the frequency gap between the first frequency segment and the second frequency segment, iv) the duration of the FDFD operation, iv) the duration of a TXOP corresponding to the FDFD operation, v) scheduling information regarding transmissions during the FDFD operation, vi) the ordering information indicating the ordering of transmissions during the FDFD operation, vii) the time slot information for transmissions during the FDFD operation, viii) the priority information for transmissions during the FDFD operation, etc.

In an embodiment, the communication frame generated at block 708 is configured to prompt a plurality of client stations 154 to participate in the FDFD operation.

In some embodiments, generating the communication frame at block 708 comprises generating an FDFD information frame, an FDFD scheduling frame, an FDFD announcement frame, etc., such as described above. In other embodiments, generating the communication frame at block 708 comprises generating a MAC data frame that includes, in a MAC header of the MAC data frame, a field having one or more indications of the one or more FDFD parameters determined at block 704, such as described above.

In an embodiment in which the communication frame generated at block 708 includes an indication of the frequency gap between the first frequency segment and the second frequency segment, the communication frame is generated to include a subfield that indicates a frequency subchannel corresponding to the gap. In another embodiment, the subfield that indicates the frequency subchannel corresponding to the gap indicates that the gap is located in the frequency subchannel.

In another embodiment in which the communication frame generated at block 708 includes an indication of the frequency gap between the first frequency segment and the second frequency segment, the communication frame is generated to include a subfield that indicates one or more frequency RUs that correspond to the gap. In another embodiment, the subfield that indicates the one or more frequency RUs is a bitmap in which respective bits correspond to respective RUs.

In an embodiment, the communication frame generated at block 708 includes a subfield such as described with reference to FIG. 6A. In another embodiment, the communication frame generated at block 708 includes a subfield such as described with reference to FIG. 6B.

At block 712, the AP 114 transmits (e.g., the network interface 122 transmits) the communication frame generated at block 708 to prompt a plurality of client stations 154 to participate in the FDFD operation. In an embodiment, block 712 comprises the MAC processor 126 controlling the network interface 122 to cause the network interface 122 to transmit the communication frame generated at block 708. In an embodiment, block 712 comprises the MAC processor 126 controlling the PHY processor 130 to cause the PHY processor 130 to transmit the communication frame generated at block 708.

In an embodiment, transmitting the communication frame at block 712 comprises transmitting an FDFD scheduling frame such as discussed with reference to FIG. 4. In another embodiment, transmitting the communication frame at block 712 comprises transmitting an FDFD announcement frame such as discussed with reference to FIG. 5.

At block 716, the AP 114 participates in the FDFD operation. For example, after transmitting the communication frame at block 712, the AP 114 transmits first PPDUs via the first frequency segment while receiving second PPDUs via the second frequency segment, wherein transmission of each at least some first PPDUs overlap in time with reception of a second PPDU, according to an embodiment. As another example, after transmitting the communication frame at block 712, the AP 114 receives first PPDUs via the first frequency segment while receiving second PPDUs via the second frequency segment, wherein the first PPDUs and the second PPDUs are unsynchronized and reception of each at least some first PPDUs overlap in time with reception of a second PPDU, according to another embodiment.

In an embodiment, participating in the FDFD operation at block 716 includes transmitting PPDUs 432 and receiving PPDUs 436 such as discussed with reference to FIG. 4. In another embodiment, participating in the FDFD operation at block 716 includes transmitting/receiving PPDUs 532 and transmitting/receiving PPDUs 536 such as discussed with reference to FIG. 5.

Figure 8:
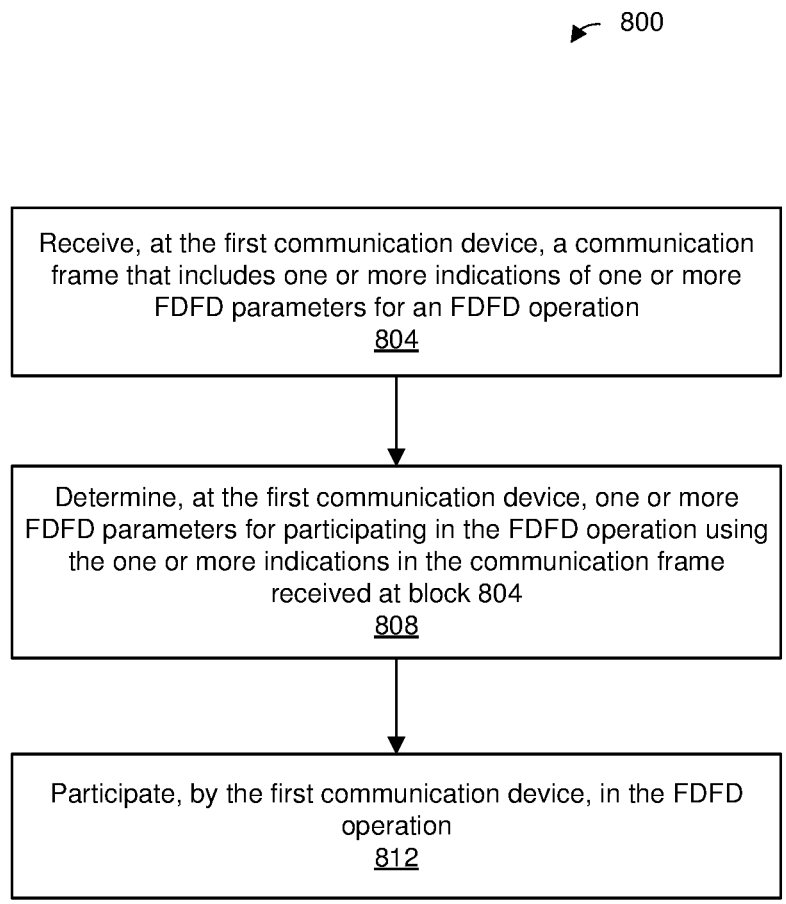
FIG. 8 is a flow diagram of another example method for participating in an FDFD operation, according to another embodiment.

FIG. 8 is a flow diagram of an example method 800 for participating in an FDFD operation in a WLAN, according to an embodiment. The method 800 is implemented by the client station 154-1 of FIG. 1, in an embodiment, and the method 800 is described with reference to FIG. 1 for ease of explanation. For example, in an embodiment, the network interface device 162 of the client station 154-1 is configured to implement the method 800. In other embodiments, however, the method 800 is implemented by another suitable communication and optionally in another suitable communication system. For instance, the method 800 is implemented by the AP 114 (e.g., by the network interface device 122 of the AP 114) of FIG. 1, in another embodiment. In other embodiments, the method 800 is implemented by another suitable communication optionally in a different communication network other than the WLAN 110.

In various embodiments, the method 800 is implemented with communication channels, and/or MAC and/or PHY data units such as described with reference to FIGS. 2, 3A-F, 4 and 5. In other embodiments, however, the method 800 is implemented with suitable communication channels, and/or suitable MAC and/or PHY data units different than those described with reference to FIGS. 2, 3A-F, 4 and 5.

At block 804, the client station 154-1 receives (e.g., the network interface 162 receive) a communication frame that includes one or more indications of one or more FDFD parameters for an FDFD operation. In various embodiments, the one or more indications in the communication frame include of one of, or any suitable combination of two or more of, i) one or more indications of one or more of a) a first frequency segment of an operating communication channel that will be used for the FDFD operation, b) a second frequency segment of the operating communication channel that will be used for the FDFD operation and in which communications will occur simultaneously with communications in the first frequency segment, c) a frequency gap between the first frequency segment and the second frequency segment, ii) an indication of a duration of the FDFD operation, iii) an indication of a duration of a TXOP corresponding to the FDFD operation, iv) scheduling information regarding transmissions during the FDFD operation, etc.

Examples of scheduling information regarding transmissions during the FDFD operation includes one of, or any suitable combination of two or more of, ordering information indicating an ordering of transmissions during the FDFD operation, time slot information for transmissions during the FDFD operation, and/or priority information for transmissions during the FDFD operation, etc., in various embodiments. In some embodiments, priority information for transmissions during the FDFD operation include, for multiple client stations 154 that are to participate in the FDFD operation, one of, or both of, i) respective AIFS values, and ii) respective CWmin values.

In some embodiments, the communication frame received at block 804 is an FDFD information frame, an FDFD scheduling frame, an FDFD announcement frame, etc., such as described above. In other embodiments, the communication frame received at block 804 is a MAC data frame that includes, in a MAC header of the MAC data frame, a field having one or more indications of the one or more FDFD parameters, such as described above.

In an embodiment in which the communication frame received at block 804 includes an indication of the frequency gap between the first frequency segment and the second frequency segment, the communication frame includes a subfield that indicates a frequency subchannel corresponding to the gap. In another embodiment, the subfield that indicates the frequency subchannel corresponding to the gap indicates that the gap is located in the frequency subchannel.

In another embodiment in which the communication frame received at block 804 includes an indication of the frequency gap between the first frequency segment and the second frequency segment, the communication frame includes a subfield that indicates one or more frequency RUs that correspond to the gap. In another embodiment, the subfield that indicates the one or more frequency RUs is a bitmap in which respective bits correspond to respective RUs.

In an embodiment, the communication frame received at block 804 includes a subfield such as described with reference to FIG. 6A. In another embodiment, the communication frame received at block 804 includes a subfield such as described with reference to FIG. 6B.

At block 808, the client station 154-1 determines (e.g., the network interface 162 determines, the MAC processor 166 determines, the FDFD controller 192 determines, etc.) one or more FDFD parameters for participating in the FDFD operation using the one or more indications in the communication frame received at block 804.

For example, in some embodiments in which the communication frame received at block 804 includes one or more indications of one or more of i) the first frequency segment, ii) the second frequency segment, and iii) the frequency gap between the first frequency segment and the second frequency segment, the client station 154-1 uses (e.g., the network interface 162 uses, the MAC processor 166 uses, the FDFD controller 192 uses, etc.) the one or more indications of the one or more of i) the first frequency segment, ii) the second frequency segment, and iii) the frequency gap between the first frequency segment and the second frequency segment, to determine the second frequency segment in which the client station 154-1 is to transmit and/or receive during the FDFD operation.

In an embodiment in which the communication frame received at block 804 includes a subfield that indicates a frequency subchannel corresponding to the gap, the client station 154-1 uses (e.g., the network interface 162 uses, the MAC processor 166 uses, the FDFD controller 192 uses, etc.) information in the subfield and information regarding an operating communication channel to determine the second frequency segment in which the client station 154-1 is to transmit and/or receive during the FDFD operation.

In another embodiment in which the communication frame received at block 804 includes a subfield that indicates one or more frequency RUs that correspond to the gap, the client station 154-1 uses (e.g., the network interface 162 uses, the MAC processor 166 uses, the FDFD controller 192 uses, etc.) information in the subfield and information regarding an operating communication channel to determine the second frequency segment in which the client station 154-1 is to transmit and/or receive during the FDFD operation.

In an embodiment, the communication frame received at block 804 includes a subfield such as described with reference to FIG. 6A. In another embodiment, the communication frame received at block 804 includes a subfield such as described with reference to FIG. 6B.

As another example, in some embodiments in which the communication frame received at block 804 includes scheduling information regarding transmissions during the FDFD operation, the client station 154-1 uses (e.g., the network interface 162 uses, the MAC processor 166 uses, the FDFD controller 192 uses, etc.) the scheduling information regarding transmissions during the FDFD operation to determine when the client station 154-1 is to transmit during the FDFD operation. In an embodiment in which the communication frame received at block 804 includes one or more indications of one or more channel access parameters that the client station 154 is to use during the FDFD operation, the client station 154-1 determines (e.g., the network interface 162 determines, the MAC processor 166 determines, the FDFD controller 192 determines, etc.) to use the indicated one or more channel access parameters during the FDFD operation.

At block 812, in response to receiving the communication frame at block 804, the client station 154-1 participates in the FDFD operation. For example, after receiving the communication frame at block 804, the client station 165-1 receives first PPDUs from the AP 114 via the first frequency segment while transmitting second PPDUs to the AP 114 via the second frequency segment, wherein reception of each at least some first PPDUs overlap in time with transmission of a second PPDU, according to an embodiment. As another example, after receiving the communication frame at block 804 and while another client station 154-2 is transmitting first PPDUs to the AP 114 via the first frequency segment, the client station 154-1 transmits second PPDUs via the second frequency segment, wherein the first PPDUs and the second PPDUs are unsynchronized and transmission of each at least some first PPDUs overlap in time with transmission of a second PPDU, according to another embodiment.

In an embodiment, participating in the FDFD operation at block 812 includes transmitting PPDUs 436 and receiving PPDUs 432 such as discussed with reference to FIG. 4. In another embodiment, participating in the FDFD operation at block 716 includes transmitting/receiving PPDUs 536 such as discussed with reference to FIG. 5.

In some embodiments in which the communication frame received at block 804 includes scheduling information regarding transmissions during the FDFD operation, participating in the FDFD operation at block 812 includes the client station 154-1 transmitting (e.g., the network interface 162 transmitting, the MAC processor 166 transmitting, the FDFD controller 192 transmitting, etc.) during the FDFD operation at times, or in an order, indicated by the scheduling information.

In an embodiment in which the communication frame received at block 804 includes one or more indications of one or more channel access parameters that the client station 154 is to use during the FDFD operation, participating in the FDFD operation at block 812 includes the client station 154-1 using (e.g., the network interface 162 using, the MAC processor 166 using, the FDFD controller 192 using, etc.) the indicated one or more channel access parameters during the FDFD operation.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for frequency division, full duplex (FDFD) communication in a wireless local area network (WLAN), the method comprising:
   determining, at a first communication device, one or more FDFD parameters for an FDFD operation that includes FDFD communications via a first frequency segment and a second frequency segment, wherein the first frequency segment and the second frequency segment are separated by a gap in frequency, and wherein determining the one or more FDFD parameters includes determining one or more channel access parameters that one or more second communication devices are to use when contending for access to a channel medium during the FDFD operation;
   generating, at the first communication device, a communication frame that includes one or more indications of the one or more FDFD parameters, wherein the one or more indications in the communication frame include one or more respective indications of the one or more channel access parameters;
   transmitting, by the first communication device, the communication frame to prompt a plurality of second communication devices to participate in the FDFD operation; and
   participating, by the first communication device, in the FDFD operation.

2. The method of claim 1, wherein:
   determining the one or more FDFD parameters for the FDFD operation comprises determining one or both of i) the second frequency segment, and ii) the gap in frequency; and
   generating the communication frame comprises including in the communication frame one or both i) an indication of the second frequency segment, and ii) an indication of the gap in frequency.

3. The method of claim 1, wherein:
   determining the one or more FDFD parameters for the FDFD operation comprises determining a duration of the FDFD operation; and
   generating the communication frame comprises including in the communication frame an indication of the duration of the FDFD operation.

4. The method of claim 1, wherein participating in the FDFD operation comprises:
   transmitting, by the first communication device, first physical layer (PHY) data units to the plurality of second communication devices via the first frequency segment; and
   receiving, at the first communication device, second PHY data units from the plurality of second communication devices via the second frequency segment.

5. The method of claim 1, wherein participating in the FDFD operation comprises:
   receiving, at the first communication device, first physical layer (PHY) data units from a third communication device via the first frequency segment; and
   receiving, at the first communication device, second PHY data units from the plurality of second communication devices via the second frequency segment.

6. The method of claim 1, wherein:
   determining the one or more channel access parameters comprises determining one or more backoff parameters corresponding to backoff operations that the one or more second communication devices are to use when contending for access to the channel medium during the FDFD operation; and
   generating the communication frame comprises generating the communication frame to include one or more respective indications of the one or more backoff parameters.

7. A first wireless communication device for communicating in a wireless local area network (WLAN), the first communication device comprising:
   a wireless network interface device comprising one or more integrated circuits (IC) devices configured to:
      determine one or more frequency division, full duplex (FDFD) parameters for an FDFD operation that includes FDFD communications via a first frequency segment and a second frequency segment, wherein the first frequency segment and the second frequency segment are separated by a gap in frequency, and wherein determining the one or more FDFD parameters includes determining one or more channel access parameters that one or more second communication devices are to use when contending for access to a channel medium during the FDFD operation,
      generate a communication frame that includes one or more indications of the one or more FDFD parameters, wherein the one or more indications in the communication frame include one or more respective indications of the one or more channel access parameters,
      transmit the communication frame to prompt a plurality of second wireless communication devices to participate in the FDFD operation, and
      participate in the FDFD operation.

8. The first wireless communication device of claim 7, wherein the one or more IC devices are configured to:
   as part of determining the one or more FDFD parameters, determine one or both of i) the second frequency segment, and ii) the gap in frequency; and
   include in the communication frame one or both i) an indication of the second frequency segment, and ii) an indication of the gap in frequency.

9. The first wireless communication device of claim 7, wherein the one or more IC devices are configured to:
   as part of determining the one or more FDFD parameters, determine a duration of the FDFD operation; and
   include in the communication frame an indication of the duration of the FDFD operation.

10. The first wireless communication device of claim 7, wherein the one or more IC devices are configured to:
transmit first physical layer (PHY) data units to the plurality of second wireless communication devices via the first frequency segment as part of the FDFD operation; and
receive second PHY data units from the plurality of second wireless communication devices via the second frequency segment as part of the FDFD operation.

11. The first wireless communication device of claim 7, wherein the one or more IC devices are configured to:
receive first physical layer (PHY) data units from a third communication device via the first frequency segment as part of the FDFD operation; and
receive second PHY data units from the plurality of second wireless communication devices via the second frequency segment as part of the FDFD operation.

12. The first wireless communication device of claim 7, wherein the one or more IC devices are configured to:
determine one or more backoff parameters corresponding to backoff operations that the one or more second communication devices are to use when contending for access to the channel medium during the FDFD operation; and
generate the communication frame to include one or more respective indications of the one or more backoff parameters.

13. A method for frequency division, full duplex (FDFD) communication in a wireless local area network (WLAN), the method comprising:
receiving, at a first communication device, a communication frame that includes one or more indications of one or more FDFD parameters for an FDFD operation that includes FDFD communications via a first frequency segment and a second frequency segment, wherein the one or more indications in the communication frame include one or more respective indications of one or more channel access parameters that the first communication device is to use when contending for access to a channel medium corresponding to the second frequency segment during the FDFD operation;
determining, at a first communication device, one or more FDFD parameters for the FDFD operation using the one or more indications of the one or more FDFD parameters in the communication frame, including using the one or more respective indications of the one or more channel access parameters to determine the one or more channel access parameters that the first communication device is to use when contending for access to the channel medium during the FDFD operation; and
participating, by the first communication device, in the FDFD operation, including i) contending for access to the channel medium corresponding to the second frequency segment during the FDFD operation according to the one or more channel access parameters, and ii) transmitting in the second frequency segment.

14. The method of claim 13, wherein:
the communication frame further comprises one or both i) an indication of the second frequency segment, and ii) an indication of the gap in frequency; and
determining the one or more FDFD parameters for the FDFD operation further comprises determining the second frequency segment using the one or both i) the indication of the second frequency segment, and ii) the indication of the gap in frequency.

15. The method of claim 13, wherein:
the communication frame further comprises an indication of a duration of the FDFD operation; and
determining the one or more FDFD parameters for the FDFD operation comprises using the indication of the duration of the FDFD operation to determine the duration of the FDFD operation.

16. The method of claim 13, wherein participating in the FDFD operation comprises:
receiving, at the first communication device, first physical layer (PHY) data units from a second communication device via the first frequency segment; and
transmitting, by the first communication device, second PHY data units to the second communication device via the second frequency segment.

17. The method of claim 13, wherein participating in the FDFD operation comprises:
transmitting, by the first communication device, first PHY data units to a second communication device via the second frequency segment while a third communication device transmits second PHY data units to the second communication device via the first frequency segment.

18. The method of claim 13, wherein:
determining the one or more FDFD parameters for the FDFD operation includes using the one or more respective indications of the one or more channel access parameters to determine one or more first channel access parameters for contending for access to the channel medium during the FDFD operation;
the method further comprises using, by the first communication device, one or more second channel access parameters for contending for access to the channel medium outside of the FDFD operation; and
the one or more first channel access parameters correspond to a higher probability of gaining access to the channel medium as compared to the one or more second channel access parameters.

19. A first wireless communication device for communicating in a wireless local area network (WLAN), the first communication device comprising:
a wireless network interface device comprising one or more integrated circuits (IC) devices configured to:
receive a communication frame that includes one or more indications of one or more frequency division, full duplex (FDFD) parameters for an FDFD operation that includes FDFD communications via a first frequency segment and a second frequency segment, wherein the one or more indications in the communication frame include one or more respective indications of one or more channel access parameters that the first communication device is to use when contending for access to a channel medium corresponding to the second frequency segment during the FDFD operation,
determine one or more FDFD parameters for the FDFD operation using the one or more indications of the one or more FDFD parameters in the communication frame, including using the one or more respective indications of the one or more channel access parameters to determine the one or more channel access parameters that the first communication device is to use when contending for access to the channel medium during the FDFD operation, and
participate in the FDFD operation, including i) contending for access to the channel medium corresponding to the second frequency segment during the FDFD operation according to the one or more channel access parameters, and ii) transmitting in the second frequency segment.

20. The first wireless communication device of claim 19, wherein:
the communication frame further comprises one or both i) an indication of the second frequency segment, and ii) an indication of the gap in frequency; and
the one or more IC devices are configured to, as part of determining the one or more FDFD parameters for the FDFD operation, determine the second frequency segment using the one or both i) the indication of the second frequency segment, and ii) the indication of the gap in frequency.

21. The first wireless communication device of claim 19, wherein:
the communication frame further comprises an indication of a duration of the FDFD operation; and
wherein the one or more IC devices are configured to use the indication of the duration of the FDFD operation to determine the duration of the FDFD operation.

22. The first wireless communication device of claim 19, wherein the one or more IC devices are configured to:
receive first physical layer (PHY) data units from a second wireless communication device via the first frequency segment during the FDFD operation; and
transmit second PHY data units to the second wireless communication device via the second frequency segment during the FDFD operation.

23. The first wireless communication device of claim 19, wherein the one or more IC devices are configured to:
transmit first PHY data units to a second wireless communication device via the second frequency segment while a third communication device transmits second PHY data units to the second wireless communication device via the first frequency segment during the FDFD operation.

24. The first wireless communication device of claim 19, wherein the one or more IC devices are configured to:
use the one or more respective indications of the one or more channel access parameters to determine one or more first channel access parameters for contending for access to the channel medium during the FDFD operation; and
use one or more second channel access parameters for contending for access to the channel medium outside of the FDFD operation, wherein the one or more first channel access parameters correspond to a higher probability of gaining access to the channel medium as compared to the one or more second channel access parameters.

* * * * *